US008169296B1

(12) United States Patent
Carlson et al.

(10) Patent No.: US 8,169,296 B1
(45) Date of Patent: May 1, 2012

(54) SWITCH MATRIX

(75) Inventors: Gary Carlson, Aliso Viejo, CA (US);
Jeffrey Norris, Lake Forest, CA (US);
Randy Raasch, Mission Viejo, CA (US);
Long Ta, Garden Grove, CA (US)

(73) Assignee: EADS North America, Inc., Irvine, CA (US)

( * ) Notice: Subject to any disclaimer, the term of this patent is extended or adjusted under 35 U.S.C. 154(b) by 1336 days.

(21) Appl. No.: 11/824,284

(22) Filed: Jun. 29, 2007

Related U.S. Application Data

(60) Provisional application No. 60/834,412, filed on Jul. 31, 2006, provisional application No. 60/874,447, filed on Dec. 11, 2006.

(51) Int. Cl.
*G08B 21/00* (2006.01)

(52) U.S. Cl. ........ 340/2.28; 340/2.1; 340/2.2; 340/2.27; 333/101; 333/105; 361/805; 370/386; 370/388

(58) Field of Classification Search .......... 340/2.2–2.28; 333/101–105; 361/805; 335/107; 370/386, 370/388
See application file for complete search history.

(56) References Cited

U.S. PATENT DOCUMENTS

| 3,573,381 | A | * | 4/1971 | Marcus | 370/378 |
|---|---|---|---|---|---|
| 3,729,591 | A | * | 4/1973 | Gueldenpfennig et al. | 340/2.21 |
| 5,049,877 | A | * | 9/1991 | Cooperman et al. | 340/2.28 |
| 5,124,638 | A | * | 6/1992 | Winroth | 324/73.1 |
| 5,276,445 | A | * | 1/1994 | Mita et al. | 340/2.24 |
| 6,430,179 | B1 | * | 8/2002 | Meyer | 370/360 |
| 6,510,222 | B1 | * | 1/2003 | Johan | 379/291 |
| 7,570,132 | B1 | * | 8/2009 | Carlson | 333/101 |

* cited by examiner

*Primary Examiner* — Jennifer Mehmood
*Assistant Examiner* — Mark Rushing

(57) ABSTRACT

A switch matrix module (600) includes programmable stub breakers (508-512, 514-518) which can break off the bus and isolate unused portion of the switch matrix. Using three-way stub breakers (508-512, 514-518) at the matrix front-ends that can either completely isolate a middle matrix or cut off stubs left or right of the destination and source matrices, allows for the formation of very large matrices which have improved operational performance.

21 Claims, 11 Drawing Sheets

SWITCH MATRIX

CROSS REFERENCE TO RELATED APPLICATION

This application claims the benefit of U.S. Provisional Application No. 60/834,412 filed on Jul. 31, 2006 and of U.S. Provisional Application No. 60/874,447 filed on Dec. 11, 2006.

FIELD OF THE INVENTION

This invention relates to field of electronics and more specifically to a switch matrix module for switching electrical signals.

BACKGROUND

Designing a switch matrix module that can handle large current loads and that can also have a high frequency bandwidth in a small footprint is no easy task to accomplish. As the dimensional size of a switch matrix increases, signal path lengths typically increase, causing a degradation of the signals being transmitted through the switch matrix.

N×M switch matrices generally are classified into one of three types: cross-point, blocking, or non-blocking. An example 2×2 switch matrix constructed as a non-blocking switch matrix is shown in the FIG. 1, a 2×2 blocking matrix is shown in FIG. 2, and a 2×2 crosspoint matrix is shown in FIG. 3.

In order to better understand these different switch matrix types, a discussion of some of the advantages and disadvantages of each type of switch matrix follows.

Non-Blocking Switch Matrices

A prior art non-blocking switch matrix as shown in FIG. 1 provides the highest frequency capabilities of any of the other types of switch matrices, well into the Giga-Hertz (GHz) range with appropriate switch selection. An N×M non-blocking switch matrix allows up to the smaller of N or M simultaneous and independent paths while minimizing or eliminating stubs that generate high Voltage Standing Wave Ratios (VSWRs).

One disadvantage found with non-blocking switch matrices is that they are the least space efficient of all three matrix types since the size of the matrix determines the number of switches and poles required. Hence an 8×8 switch would require 16 separate 1×8 switches to implement. Non-blocking switch matrices make it difficult to route electrical interconnections on printed circuit boards. Such interconnections are typically implemented in practice using discrete coaxial cable connections which create a bulky, space-inefficient situation. Non-blocking switch matrices are also difficult to use as a building block for a larger sized switch matrix since even more difficult interconnects would be required.

Blocking Switch Matrices

Blocking switching matrices as shown in FIG. 2 have the highest operating frequency potential, well into the GHz range with appropriate switch selection. These switch matrices also use up a very small footprint and require only one switch with N poles and another with M poles. Another advantage of the blocking switch matrices is that they require single cable interconnects which minimizes the tangling of cables.

Some of the disadvantage inherent with blocking switch matrices is that they are difficult to use as building blocks to build larger-sized switch matrices a major disadvantage in some applications. Also, blocking switch matrices only allow for a single electrical signal path to exist at any given point in time.

Cross-Point Matrices:

Cross-point matrices such as that shown in FIG. 3 have the highest density potential of all matrix types and as such are conducive to printed circuit board layout designs. An N×M cross-point matrix allows up to the smaller of N or M simultaneous and independent paths. A cross-point matrix also makes it easy to replace relays when a printed circuit board layout design is used for interconnects. Other advantages of cross-point matrices are that they have relatively few internal interconnects: N+M, provide for single cable interconnects and are easy to use as building blocks to create larger matrix sizes on the same circuit board.

A disadvantage of cross-point matrices is that stubbing is difficult to control on larger matrix sizes and can seriously deteriorate higher frequency performance if not controlled. Cross-point matrices also have frequency performance characteristics significantly less than the other matrix types, in the MHz range versus GHz for the other types since high-frequency ("can") switches do not have a physical geometry conductive to this matrix layout. Cross-point switch matrices also make it difficult to build larger matrix sizes where the matrices span different circuit cards (modules) without creating additional stubbing problems.

BRIEF DESCRIPTION OF THE DRAWINGS

The features of the present invention, which are believed to be novel, are set forth with particularity in the appended claims. The invention may best be understood by reference to the following description, taken in conjunction with the accompanying drawings, in the several figures of which like reference numerals identify like elements, and in which:

DETAILED DESCRIPTION

Figure 1:
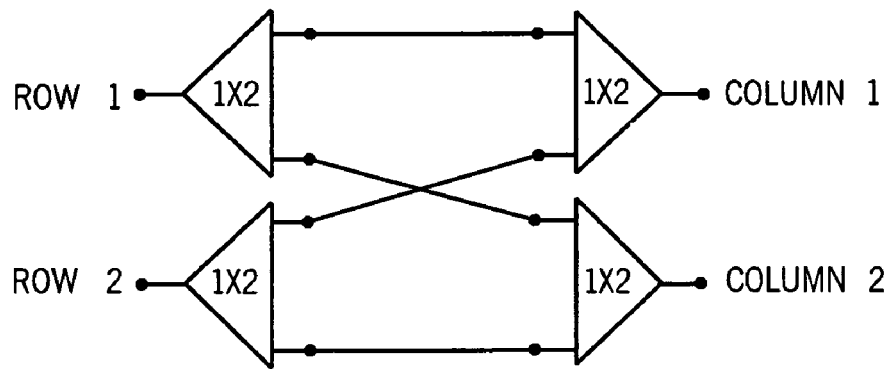
FIG. 1 shows a prior art 2×2 non-blocking matrix.
Figure 2:
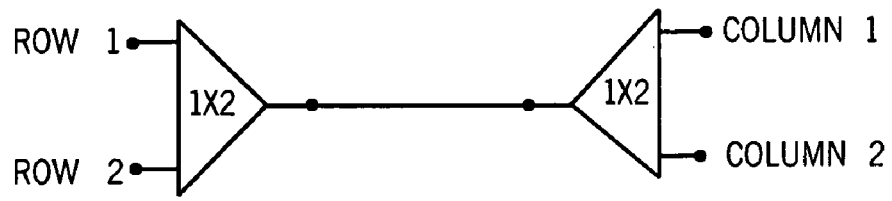
FIG. 2 shows a prior art 2×2 blocking matrix.
Figure 3:
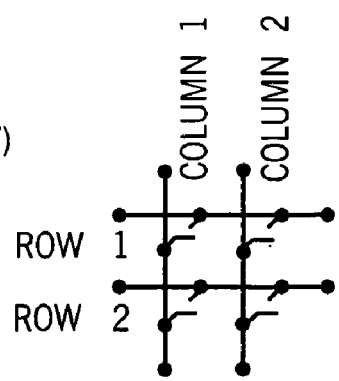
FIG. 3 shows a prior art 2×2 crosspoint matrix.

While the specification concludes with claims defining the features of the invention that are regarded as novel, it is believed that the invention will be better understood from a consideration of the following description in conjunction with the drawing figures.

In accordance with one embodiment of the invention a high density switch matrix module comprising three 8×24 single-wire matrices, which are interconnected via a 10-lane, single wire bus and placed in a single-slot VXI card with each path having 2 ampere (A) switching capability and a minimum 60 MHz bandwidth is disclosed. Onboard configurable relays allow for software control of the matrix configuration. The switch module of the invention uses a cross-point matrix design with software-coordinated stub breakers which are switches which can break-off and isolate unused portions of the switch matrix in order to achieve its improved performance characteristics.

In one embodiment of the invention, the switch matrix module can be used to connect a large number of test instruments to a large number of test points as one example of its use. Designed for single-wire 50 ohm operation and providing exceptional signal isolation, the switch matrix module can be used for example for audio, video, telecom, data-com and automatic test equipment (ATE) systems testing. Although a single-wire design is discussed, the present invention can also support differential measurement designs. In another design, multiple switching modules are chained together via their expansion bus. It should be noted that the invention is not limited to the embodiments described herein and that other switch matrix designs can take advantage of the features of the invention.

In one embodiment, the switch matrix module achieves some of the specifications shown in Table 1 below, although other specifications may be achieved depending on the particular design requirements at hand.

TABLE 1

| | |
|---|---|
| Maximum Switching Voltage: | 220 VDC or 250 VAC |
| Maximum Switching Current: | 2 ADC or 2 AAC |
| DC Performance: | |
| Path Resistance: | >1.1 Ohm (8 × 24 configuration) |
| | 500 m Ohm (1 × 4 configuration) |
| Thermal EMF: | <10 uV |
| Impedance: | 50 ohm |
| AC Performance: | |
| Bandwidth: | >40 MHz (8 × 24 configuration) |
| | >40 MHz (1 × 4 configuration) |
| Insertion Loss: | |
| 8 × 24 Configuration: | |
| 10 MHz: | <1.0 dB |
| 40 MHZ: | <3.0 dB |
| 1 × 4 Configuration: | |
| 10 MHz: | <1.0 dB |
| 40 MHZ: | <2.5 dB |
| Isolation: | |
| 8 × 24 Configuration: | |
| 100 KHz: | >80 dB |
| 1 MHZ: | >60 dB |
| 10 MHz: | >40 dB |
| 1 × 4 Configuration: | |
| 100 KHz: | >80 dB |
| 1 MHZ: | >60 dB |
| 10 MHz: | >40 dB |
| Crosstalk: | |
| 8 × 24 Configuration: | |
| 100 KHz: | <−70 dB |
| 1 MHZ: | <−55 dB |
| 10 MHz: | <−38 dB |
| Crosstalk: | |
| 1 × 4 Configuration: | |
| 100 KHz: | <−70 dB |
| 1 MHZ: | <−60 dB |
| 10 MHz: | <−40 dB |

TABLE 1-continued

| | |
|---|---|
| Terminations: | |
| There is a one load set for each 8 × 24 matrix including one pull-up (to +5 V)/one pull-down (to ground). The load set is individually programmable to the following values and accuracies: | |
| 50 ohms: | +15/−5 Ohms, ¾ W |
| 75 ohms: | +17.5/−7.5 Ohms, ¾ W |
| 100 ohms: | +20/−10 Ohms, ¾ W |
| 1000 ohms: | +110/0100 Ohms, ¾ W |

Figure 4:
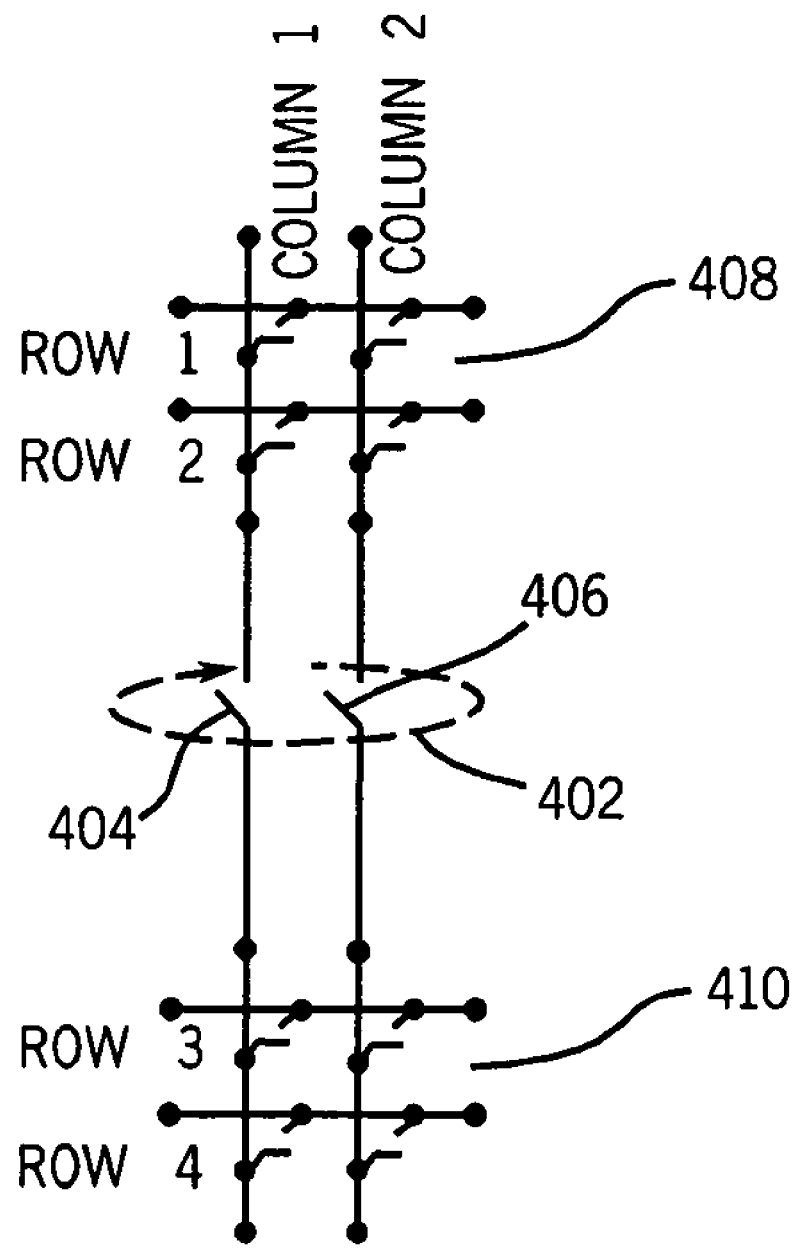
FIG. 4 shows a 4×2 crosspoint matrix with software controlled stub breakers in accordance with one aspect of the invention.

Referring to FIG. 4, there is shown an example of two separate 2×2 cross-point matrices 408 and 410 with a stub breaker 406 having switches 404 and 402 which are software controlled to isolate and connect the required portions of the matrix to create a 4×2 matrix with improved performance in accordance with the invention. Based on any given path, the software controlling the switch matrix can determine the closest stub breakers (e.g., stub breaker 406) to open using signal graph theory for optimal frequency performance. The software is executed by a switch matrix controller (not shown) which can be implemented using one of a number of computers or computer cards (e.g., VXI computer card) depending on the particular design requirements. One of the biggest drawbacks of using cross-point matrices, stub formation, is reduced automatically by using these software controlled stub breakers as used in the invention. By mapping of any switch topology into Mutually Exclusive Sets has allowed the switch matrix module to retain good switch driver performance.

The controller for the switch matrix card complies a path search data structure which takes O(log 2n) using a Red-Black tree embedded within a Red-black tree. The advantages of this approach over using a hash table is that the Red-Black tree is always balanced so searching for any path takes roughly the same amount of time. This data structure is also unique in that it can store multiple alternative paths so that if one path is restricted, the driver can quickly search for other alternative paths which do not suffer from the same restrictions which has enabled the implementation of a highly interconnected topology such as the switch matrix module of the present invention. A best path searching algorithm is also provided that can determine the best possible path by traversing through each edge of the graph representing the switch matrix module and recursively walking the graph until a best possible path or until no path is found to satisfy the required switching conditions.

Figure 5:
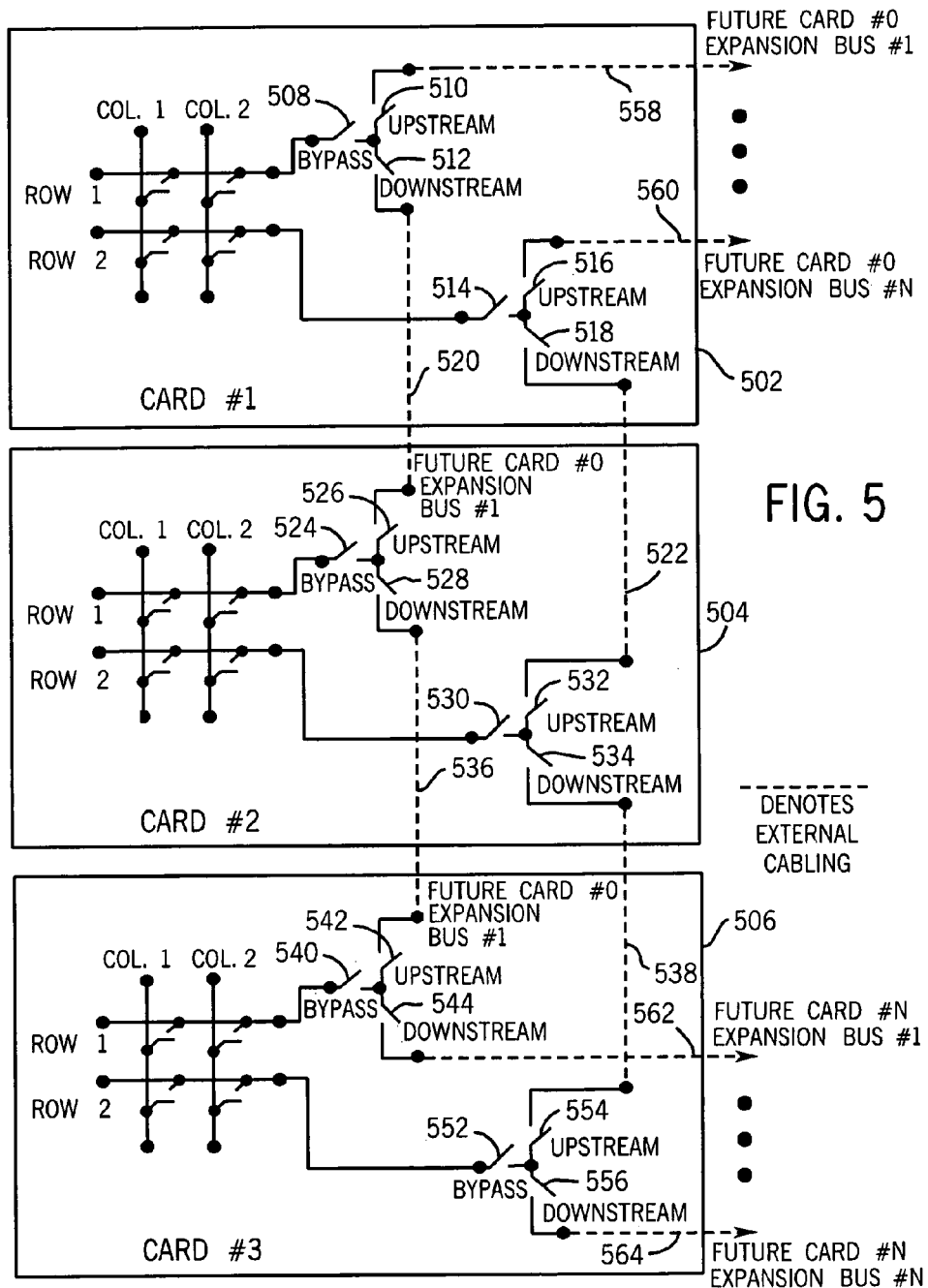
FIG. 5 shows a switch matrix module in accordance with one aspect of the invention.

Another technique used in the invention to provide improved performance is to minimize the frequency limiting stubs caused when cross-point matrices span over multiple circuit cards. In order to overcome this stub formation in large switch matrices, in the invention each matrix implements a "3-way" stub-breakers at the matrix front-ends that can either completely isolate a middle matrix or cut off stubs left or right of the destination and source matrices. FIG. 5 illustrates this using a 2×6 matrix comprising cards 502, 504 and 506 each having a 2×2 cross-point matrix 546, 548 and 550 as an example. Like the intra-matrix stub-breakers previously described above, the software operating the switch matrix implements signal flow optimization to determine which of the three switches, if any should be connected and to which expansion bus to effect the connections that span the multiple cards 502, 504 and 506.

Card #1 (502) includes a first three-way switch including switches 508, 510 and 512 and a second three-way switch including switches 514, 516 and 518. Each of the other two cards, Card #2 (504) and Card #3 (506) include two three-way switches. Card #2 (504) includes a first three-way switch including switches 524, 526 and 528 and a second three-way switch that includes switches 530, 532 and 534. Card #3 (506)

includes a first three-way switch that includes switches 540, 542 and 544 and a second three-way switch that includes switches 552, 554 and 556. These three-way switches control the connections that can span multiple cards (expansion points) while maximizing frequency performance since any unneeded paths are isolated via the software controlled switches.

Figure 8:
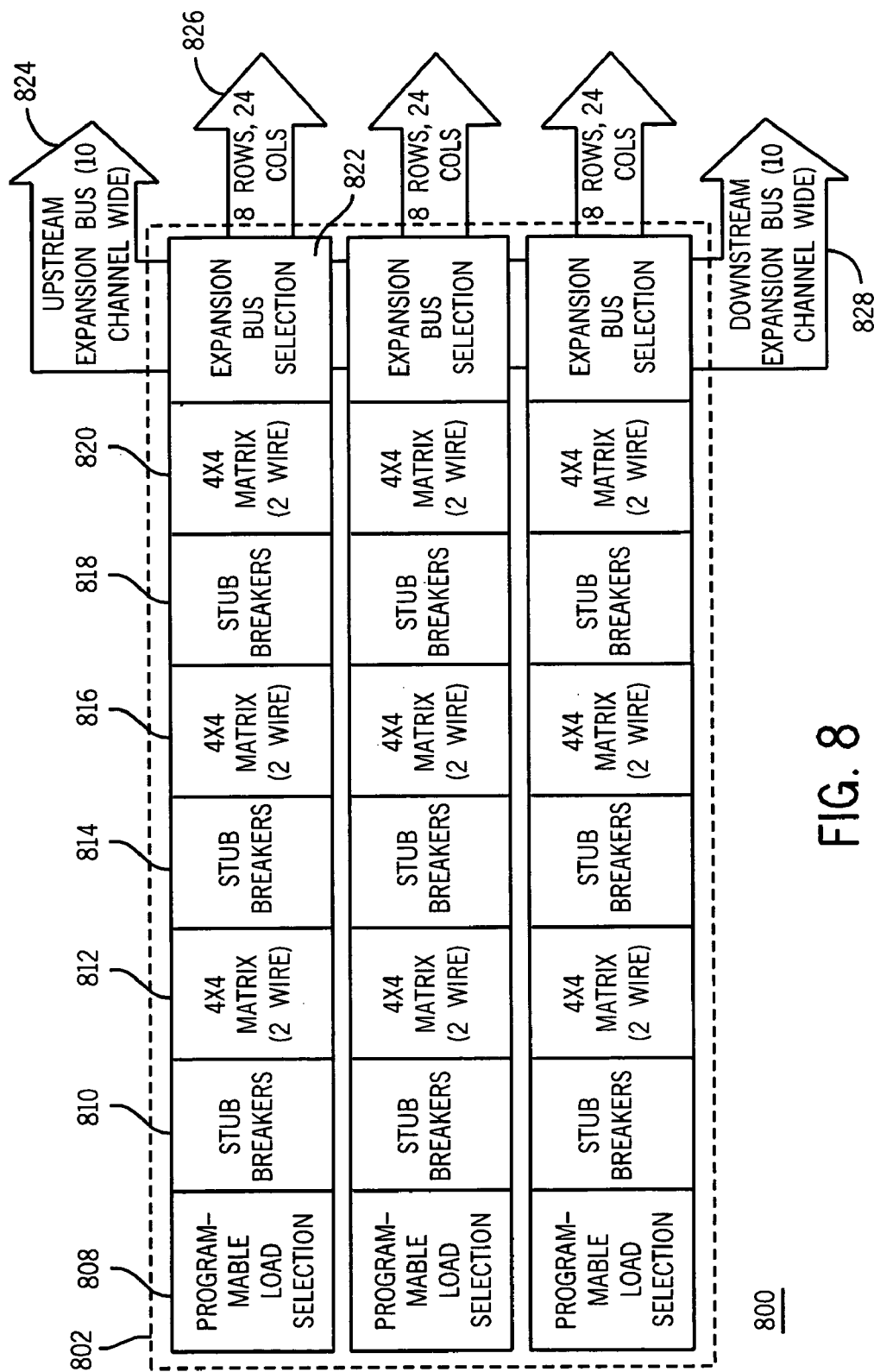
FIG. 8 a signal flow block diagram of the switch matrix module shown in FIG. 6.

The switch matrix of the invention utilizes a physical layout geometry that is optimized for frequency performance and yet also allows programmable load terminations to exist in the design without creating additional stub penalties. In FIG. 8, block diagram 800 of a switch matrix module illustrates the signal flow in block form through the matrix. In card 802, the programmable load selection is performed in block 808, with the three 4×4 matrices 812, 816 and 820 can be isolated from each other as needed by stub breakers 810, 814 and 818. In block 822 expansion block selection is performed. An upstream 824 and a downstream 828 expansion bus which is 10 channels wide are also shown in switch matrix module 800. The other two cards that make up the switch matrix module 800 are also shown.

Figure 6:
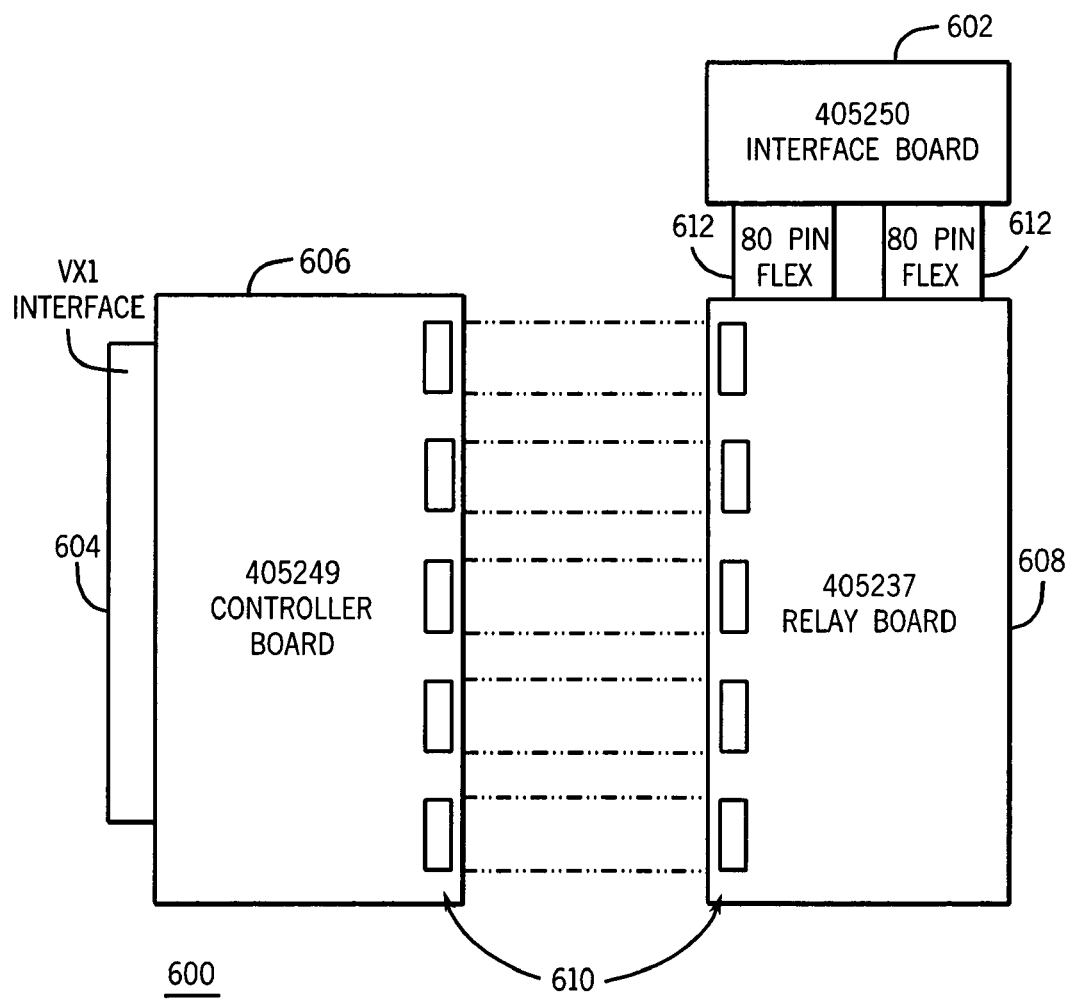
FIG. 6 shows a physical block diagram of a switch matrix module in accordance with an embodiment of the invention.

Referring now to FIG. 6, there is shown a physical block diagram of a switch matrix module 600 in accordance with one embodiment of the invention. The switch matrix module 600 includes a VXI bus interface 604, a controller board 606, a relay board 608 coupled to the controller board 606 via a plurality of 200-pin connectors 610 interconnecting the two boards. The relay board 608 is coupled to an interface board 602 via two 80 pin flex cables or connectors. The main controller board 606 is used in interfacing to the VXI bus and thus has all the control logic for communicating with the bus. In addition the control board 606 decodes the address's that select the relay enable read/write ports.

In one embodiment, the relay board 608 contains 900 relays of which 450 relays are on top (first side) with another 450 relays on the bottom (opposite side) of the printed circuit board. As mentioned, the controller board 606 connects to the relay board 608 via 200 pin flex cables 610. The flex cables pass the relay coil enabling signals from the control board 606 to the relay board 608. The interface board 602 contains eight connectors used to connect to the outside world. The interface board 602 connects to the relay board 608 using two 80 pin flex cables 612 as previously mentioned.

Figure 7:
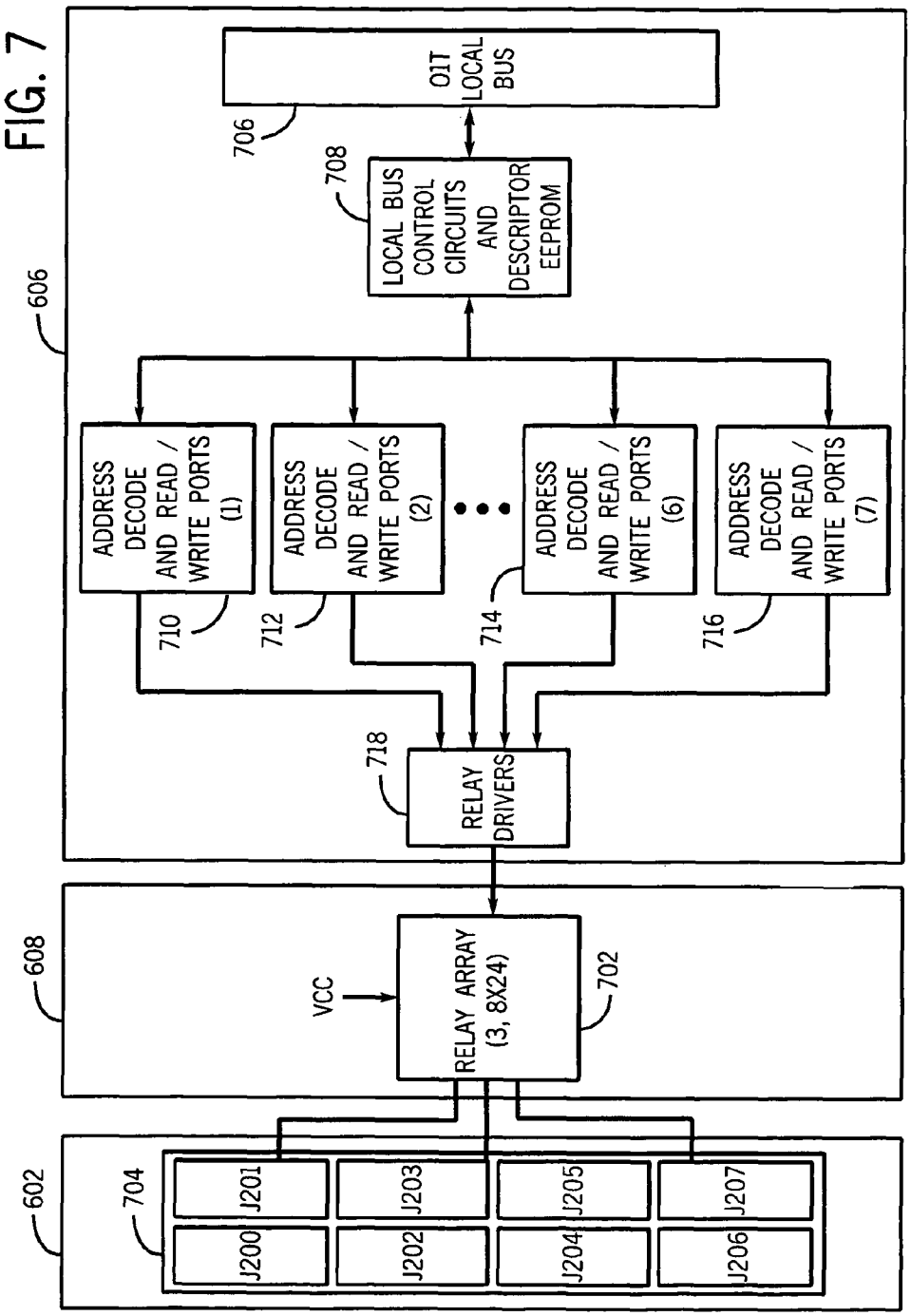
FIG. 7 shows a logical block diagram of the switch matrix module shown in FIG. 6.

A logical block diagram of the switch matrix module 600 is shown in FIG. 7. The Interface board includes six 34-pin front-panel connectors, labeled J200-J205 and two 20-pin connectors, labeled J206 and J207. Each matrix includes a pair of 34-pin connectors. The two 20-pin connectors are used for bussing the 10 lane bus in and out of the matrix module. Table 2 shows the signal assignments to connector pins for each of the connectors:

TABLE 2

Front Panel Pinouts

| J200 | | | |
|---|---|---|---|
| 1 | GND | 2 | O23C+ |
| 3 | GND | 4 | O21C+ |
| 5 | GND | 6 | O19C+ |
| 7 | GND | 8 | O17C+ |
| 9 | GND | 10 | O15C+ |
| 11 | GND | 12 | O13C+ |
| 13 | GND | 14 | O11C+ |
| 15 | GND | 16 | O9C+ |
| 17 | GND | 18 | O7C+ |
| 19 | GND | 20 | O5C+ |
| 21 | GND | 22 | O3C+ |
| 23 | GND | 24 | O1C+ |
| 25 | GND | 26 | I7C+ |
| 27 | GND | 28 | I5C+ |

TABLE 2-continued

Front Panel Pinouts

| 29 | GND | 30 | I3C+ |
|---|---|---|---|
| 31 | GND | 32 | I1C+ |
| 33 | NC | 34 | NC |
| J201 | | | |
| 1 | GND | 2 | O24C+ |
| 3 | GND | 4 | O22C+ |
| 5 | GND | 6 | O20C+ |
| 7 | GND | 8 | O18C+ |
| 9 | GND | 10 | O16C+ |
| 11 | GND | 12 | O14C+ |
| 13 | GND | 14 | O12C+ |
| 15 | GND | 16 | O10C+ |
| 17 | GND | 18 | O8C+ |
| 19 | GND | 20 | O6C+ |
| 21 | GND | 22 | O4C+ |
| 23 | GND | 24 | O2C+ |
| 25 | GND | 26 | I8C+ |
| 27 | GND | 28 | I6C+ |
| 29 | GND | 30 | I4C+ |
| 31 | GND | 32 | I2C+ |
| 33 | NC | 34 | NC |
| J202 | | | |
| 1 | GND | 2 | O23B+ |
| 3 | GND | 4 | O21B+ |
| 5 | GND | 6 | O19B+ |
| 7 | GND | 8 | O17B+ |
| 9 | GND | 10 | O15B+ |
| 11 | GND | 12 | O13B+ |
| 13 | GND | 14 | O11B+ |
| 15 | GND | 16 | O9B+ |
| 17 | GND | 18 | O7B+ |
| 19 | GND | 20 | O5B+ |
| 21 | GND | 22 | O3B+ |
| 23 | GND | 24 | O1B+ |
| 25 | GND | 26 | I7B+ |
| 27 | GND | 28 | I5B+ |
| 29 | GND | 30 | I3B+ |
| 31 | GND | 32 | I1B+ |
| 33 | NC | 34 | NC |
| J203 | | | |
| 1 | GND | 2 | O24B+ |
| 3 | GND | 4 | O22B+ |
| 5 | GND | 6 | O20B+ |
| 7 | GND | 8 | O18B+ |
| 9 | GND | 10 | O16B+ |
| 11 | GND | 12 | O14B+ |
| 13 | GND | 14 | O12B+ |
| 15 | GND | 16 | O10B+ |
| 17 | GND | 18 | O8B+ |
| 19 | GND | 20 | O6B+ |
| 21 | GND | 22 | O4B+ |
| 23 | GND | 24 | O2B+ |
| 25 | GND | 26 | I8B+ |
| 27 | GND | 28 | I6B+ |
| 29 | GND | 30 | I4B+ |
| 31 | GND | 32 | I2B+ |
| 33 | NC | 34 | NC |
| J204 | | | |
| 1 | GND | 2 | O23A+ |
| 3 | GND | 4 | O21A+ |
| 5 | GND | 6 | O19A+ |
| 7 | GND | 8 | O17A+ |
| 9 | GND | 10 | O15A+ |
| 11 | GND | 12 | O13A+ |
| 13 | GND | 14 | O11A+ |
| 15 | GND | 16 | O9A+ |
| 17 | GND | 18 | O7A+ |
| 19 | GND | 20 | O5A+ |
| 21 | GND | 22 | O3A+ |
| 23 | GND | 24 | O1A+ |
| 25 | GND | 26 | I7A+ |
| 27 | GND | 28 | I5A+ |
| 29 | GND | 30 | I3A+ |
| 31 | GND | 32 | I1A+ |

TABLE 2-continued

Front Panel Pinouts

| 33 | NC | 34 | NC |
|---|---|---|---|

J205

| 1 | GND | 2 | O24A+ |
|---|---|---|---|
| 3 | GND | 4 | O22A+ |
| 5 | GND | 6 | O20A+ |
| 7 | GND | 8 | O18A+ |
| 9 | GND | 10 | O16A+ |
| 11 | GND | 12 | O14A+ |
| 13 | GND | 14 | O12A+ |
| 15 | GND | 16 | O10A+ |
| 17 | GND | 18 | O8A+ |
| 19 | GND | 20 | O6A+ |
| 21 | GND | 22 | O4A+ |
| 23 | GND | 24 | O2A+ |
| 25 | GND | 26 | I8A+ |
| 27 | GND | 28 | I6A+ |
| 29 | GND | 30 | I4A+ |
| 31 | GND | 32 | I2A+ |
| 33 | NC | 34 | NC |

J206

| 1 | GND | 2 | BUS_IN 9+ |
|---|---|---|---|
| 3 | GND | 4 | BUS_IN 8+ |
| 5 | GND | 6 | BUS_IN 7+ |
| 7 | GND | 8 | BUS_IN 6+ |
| 9 | GND | 10 | BUS_IN 5+ |
| 11 | GND | 12 | BUS_IN 4+ |
| 13 | GND | 14 | BUS_IN 3+ |
| 15 | GND | 16 | BUS_IN 2+ |
| 17 | GND | 18 | BUS_IN 1+ |
| 19 | GND | 20 | BUS_IN 0+ |

J207

| 1 | GND | 2 | BUS_OUT 9+ |
|---|---|---|---|
| 3 | GND | 4 | BUS_OUT 8+ |
| 5 | GND | 6 | BUS_OUT 7+ |
| 7 | GND | 8 | BUS_OUT 6+ |
| 9 | GND | 10 | BUS_OUT 5+ |
| 11 | GND | 12 | BUS_OUT 4+ |
| 13 | GND | 14 | BUS_OUT 3+ |
| 15 | GND | 16 | BUS_OUT 2+ |
| 17 | GND | 18 | BUS_OUT 1+ |
| 19 | GND | 20 | BUS_OUT 0+ |

In one embodiment, the matrix module is operated in a register-based mode, the user writes directly to the control registers on the matrix module. The matrix command module does not monitor these operations, and does not keep track of the relay states on the matrix module in this mode. The register-based mode provides faster control of relay channels. In this mode, relay operations are processed in less than nine microseconds, not counting relay settling time or software overhead inherent in I/O libraries such as VISA.

In the register mode, the matrix module is operated by directly writing to control registers and reading from status registers on the matrix module. There are 180 control/status register pairs on the matrix module. When a control register is written to, all channels controlled by that register are operated simultaneously. Default value for all control registers is hex "00" after reset. The matrix module has a 10 lane bus that is routed through the three matrices. With the exception of the matrix output relay groups, each group of relays operating on the bus is comprised of 10 relays. The matrix output relay groups only operate on 5 of the 10 signals of the bus and thus have only one control/status register associated with each group. For the rest of the relay groups an A and B control/status register pair is assigned to each group. Only bits 4-0 of the register are used. Bits 7-5 are not used and will display "111" when the status register is read. Register "A" is assigned to bus signals 4-0 while register "B: is assigned to bus signals 9-5.

The control registers are located in the VXI bus A24 address space. The A24 address for a control register depends on:
1. The A24 Address Offset assigned to the command module by the resource manager program. The resource manager program is provided by the VXI bus slot-0 controller vendor. The A24 Address Offset is placed into the "Offset Register" of the command module by the Resource Manger.
2. The <module address> of the matrix module have a value in the range of 1 through 12.
3. Each control/status register on the matrix module has a unique address.

The base A24 address for the matrix module may be calculated by:

($A$24 Offset of Option-01$T$)+(1024×Module Address of the matrix module).

The A24 address offset is usually expressed in hexadecimal. A typical value of $204000_{16}$ is used in the examples that follow. A matrix module with a module address of 6 would have the base A24 address computed as follows:

Base $A$24 Address of matrix module=$204000_{16}$+ $(400_{16} \times 6_{16}) = 205800_{16}$ The control registers for these series of VXI modules are always on odd-numbered A24 Addresses. The first two control registers for the matrix module reside at the first two odd-numbered A24 addresses for the module:

(Base $A$24 Address of matrix module)+1=Control Register 0;

(Base $A$24 Address of matrix module)+3=Control Register 1;

So, for our example, the two control registers are located at: 205801 for Control Register 0 and 205803 for Control Register1.

Table 3 below shows the Address assignment for each Control/Status register, while Table 4 shows the Control/Status Register Relay/Bus Assignments.

TABLE 0

Control/Status Register Address Offset Assignments

| Control/Status | Address | Function |
|---|---|---|
| Reg. 00A | 001 | Input Bus to Matrix Bus 'A' (lower bus bits 4-0) |
| Reg. 00B | 003 | Input Bus to Matrix Bus 'A' (upper bus bits 9-5) |
| Reg. 01A | 005 | Bypass Matrix Bus 'A' to Internal Bus 'B' (lower bus bits 4-0) |
| Reg. 01B | 007 | Bypass Matrix Bus 'A' to Internal Bus 'B' (upper bus bits 9-5) |
| Reg. 02A | 009 | Internal Bus 'B' to Matrix Bus 'B' (lower bus bits 4-0) |
| Reg. 02B | 00B | Internal Bus 'B' to Matrix Bus 'B' (upper bus bits 9-5) |
| Reg. 03A | 00D | Bypass Matrix Bus 'B' to Internal Bus 'C' (lower bus bits 4-0) |
| Reg. 03B | 00F | Bypass Matrix Bus 'B' to Internal Bus 'C' (upper bus bits 9-5) |
| Reg. 04A | 011 | Internal Bus 'C' to Matrix Bus 'C' (lower bus bits 4-0) |
| Reg. 04B | 013 | Internal Bus 'C' to Matrix Bus 'C' (upper bus bits 9-5) |
| Reg. 05A | 015 | Bypass Matrix Bus 'C' to Output Bus (lower bus bits 4-0) |
| Reg. 05B | 017 | Bypass Matrix Bus 'C' to Output Bus (upper bus bits 9-5) |
| Reg. 06A | 019 | Matrix Bus 'A' Stub Break 1 (lower bus bits 4-0) |
| Reg. 06B | 01B | Matrix Bus 'A' Stub Break 1 (upper bus bits 9-5) |

TABLE 0-continued

Control/Status Register Address Offset Assignments

| Control/Status | Address | Function |
|---|---|---|
| Reg. 07A | 01D | Matrix Bus 'A' Stub Break 2 (lower bus bits 4-0) |
| Reg. 07B | 01F | Matrix Bus 'A' Stub Break 2 (upper bus bits 9-5) |
| Reg. 08A | 021 | Matrix Bus 'A' Stub Break 3 (lower bus bits 4-0) |
| Reg. 08B | 023 | Matrix Bus 'A' Stub Break 3 (upper bus bits 9-5) |
| Reg. 09A | 025 | Matrix Bus 'A' Stub Break 4 (lower bus bits 4-0) |
| Reg. 09B | 027 | Matrix Bus 'A' Stub Break 4 (upper bus bits 9-5) |
| Reg. 10A | 029 | Matrix Bus 'B' Stub Break 1 (lower bus bits 4-0) |
| Reg. 10B | 02B | Matrix Bus 'B' Stub Break 1 (upper bus bits 9-5) |
| Reg. 11A | 02D | Matrix Bus 'B' Stub Break 2 (lower bus bits 4-0) |
| Reg. 11B | 02F | Matrix Bus 'B' Stub Break 2 (upper bus bits 9-5) |
| Reg. 12A | 031 | Matrix Bus 'B' Stub Break 3 (lower bus bits 4-0) |
| Reg. 12B | 033 | Matrix Bus 'B' Stub Break 3 (upper bus bits 9-5) |
| Reserved | 035-03F | |
| Reg. 13A | 041 | Matrix Bus 'B' Stub Break 4 (lower bus bits 4-0) |
| Reg. 13B | 043 | Matrix Bus 'B' Stub Break 4 (upper bus bits 9-5) |
| Reg. 14A | 045 | Matrix Bus 'C' Stub Break 1 (lower bus bits 4-0) |
| Reg. 14B | 047 | Matrix Bus 'C' Stub Break 1 (upper bus bits 9-5) |
| Reg. 15A | 049 | Matrix Bus 'C' Stub Break 2 (lower bus bits 4-0) |
| Reg. 15B | 04B | Matrix Bus 'C' Stub Break 2 (upper bus bits 9-5) |
| Reg. 16A | 04D | Matrix Bus 'C' Stub Break 3 (lower bus bits 4-0) |
| Reg. 16B | 04F | Matrix Bus 'C' Stub Break 3 (upper bus bits 9-5) |
| Reg. 17A | 051 | Matrix Bus 'C' Stub Break 4 (lower bus bits 4-0) |
| Reg. 17B | 053 | Matrix Bus 'C' Stub Break 4 (upper bus bits 9-5) |
| Reg. 18A | 055 | Matrix Bus 'A' Pull-up/Pull-down for Load 1 |
| Reg. 18B | 057 | Matrix Bus 'A' Pull-up/Pull-down for Load 2 |
| Reg. 19A | 059 | Matrix Bus 'A' Resistor Selection for Load 1 |
| Reg. 19B | 05B | Matrix Bus 'A' Resistor Selection for Load 2 |
| Reg. 20A | 05D | Matrix Bus 'A' Load 1 Connection (lower bus bits 4-0) |
| Reg. 20B | 05F | Matrix Bus 'A' Load 1 Connection (upper bus bits 9-5) |
| Reg. 21A | 061 | Matrix Bus 'A' Load 2 Connection (lower bus bits 4-0) |
| Reg. 21B | 063 | Matrix Bus 'A' Load 2 Connection (upper bus bits 9-5) |
| Reg. 22A | 065 | Matrix Bus 'B' Pull-up/Pull-down for Load 1 |
| Reg. 22B | 067 | Matrix Bus 'B' Pull-up/Pull-down for Load 2 |
| Reg. 23A | 069 | Matrix Bus 'B' Resistor Selection for Load 1 |
| Reg. 23B | 06B | Matrix Bus 'B' Resistor Selection for Load 2 |
| Reg. 24A | 06D | Matrix Bus 'B' Load 1 Connection (lower bus bits 4-0) |
| Reg. 24B | 06F | Matrix Bus 'B' Load 1 Connection (upper bus bits 9-5) |
| Reg. 25A | 071 | Matrix Bus 'B' Load 2 Connection (lower bus bits 4-0) |
| Reg. 25B | 073 | Matrix Bus 'B' Load 2 Connection (upper bus bits 9-5) |
| Reserved | 075-07F | |
| Reg. 26A | 081 | Matrix Bus 'C' Pull-up/Pull-down for Load 1 |
| Reg. 26B | 083 | Matrix Bus 'C' Pull-up/Pull-down for Load 2 |
| Reg. 27A | 085 | Matrix Bus 'C' Resistor Selection for Load 1 |
| Reg. 27B | 087 | Matrix Bus 'C' Resistor Selection for Load 2 |
| Reg. 28A | 089 | Matrix Bus 'C' Load 1 Connection (lower bus bits 4-0) |
| Reg. 28B | 08B | Matrix Bus 'C' Load 1 Connection (upper bus bits 9-5) |
| Reg. 29A | 08D | Matrix Bus 'C' Load 2 Connection (lower bus bits 4-0) |
| Reg. 29B | 08F | Matrix Bus 'C' Load 2 Connection (upper bus bits 9-5) |
| Reg. 30A | 091 | Matrix Bus 'A' Instrument Input 1 (lower bus bits 4-0) |
| Reg. 30B | 093 | Matrix Bus 'A' Instrument Input 1 (upper bus bits 9-5) |
| Reg. 31A | 095 | Matrix Bus 'A' Instrument Input 2 (lower bus bits 4-0) |
| Reg. 31B | 097 | Matrix Bus 'A' Instrument Input 2 (upper bus bits 9-5) |
| Reg. 32A | 099 | Matrix Bus 'A' Instrument Input 3 (lower bus bits 4-0) |
| Reg. 32B | 09B | Matrix Bus 'A' Instrument Input 3 (upper bus bits 9-5) |
| Reg. 33A | 09D | Matrix Bus 'A' Instrument Input 4 (lower bus bits 4-0) |
| Reg. 33B | 09F | Matrix Bus 'A' Instrument Input 4 (upper bus bits 9-5) |
| Reg. 34A | 0A1 | Matrix Bus 'A' Instrument Input 5 (lower bus bits 4-0) |
| Reg. 34B | 0A3 | Matrix Bus 'A' Instrument Input 5 (upper bus bits 9-5) |
| Reg. 35A | 0A5 | Matrix Bus 'A' Instrument Input 6 (lower bus bits 4-0) |
| Reg. 35B | 0A7 | Matrix Bus 'A' Instrument Input 6 (upper bus bits 9-5) |
| Reg. 36A | 0A9 | Matrix Bus 'A' Instrument Input 7 (lower bus bits 4-0) |
| Reg. 36B | 0AB | Matrix Bus 'A' Instrument Input 7 (upper bus bits 9-5) |
| Reg. 37A | 0AD | Matrix Bus 'A' Instrument Input 8 (lower bus bits 4-0) |
| Reg. 37B | 0AF | Matrix Bus 'A' Instrument Input 8 (upper bus bits 9-5) |
| Reg. 38 | 0B1 | Matrix Bus 'A' Output 1 |
| Reg. 39 | 0B3 | Matrix Bus 'A' Output 2 |
| Reserved | 0B5-0BF | |
| Reg. 40 | 0C1 | Matrix Bus 'A' Output 3 |
| Reg. 41 | 0C3 | Matrix Bus 'A' Output 4 |
| Reg. 42 | 0C5 | Matrix Bus 'A' Output 5 |
| Reg. 43 | 0C7 | Matrix Bus 'A' Output 6 |
| Reg. 44 | 0C9 | Matrix Bus 'A' Output 7 |
| Reg. 45 | 0CB | Matrix Bus 'A' Output 8 |
| Reg. 46 | 0CD | Matrix Bus 'A' Output 9 |
| Reg. 47 | 0CF | Matrix Bus 'A' Output 10 |
| Reg. 48 | 0D1 | Matrix Bus 'A' Output 11 |
| Reg. 49 | 0D3 | Matrix Bus 'A' Output 12 |
| Reg. 50 | 0D5 | Matrix Bus 'A' Output 13 |
| Reg. 51 | 0D7 | Matrix Bus 'A' Output 14 |
| Reg. 52 | 0D9 | Matrix Bus 'A' Output 15 |
| Reg. 53 | 0DB | Matrix Bus 'A' Output 16 |
| Reg. 54 | 0DD | Matrix Bus 'A' Output 17 |
| Reg. 55 | 0DF | Matrix Bus 'A' Output 18 |
| Reg. 56 | 0E1 | Matrix Bus 'A' Output 19 |
| Reg. 57 | 0E3 | Matrix Bus 'A' Output 20 |
| Reg. 58 | 0E5 | Matrix Bus 'A' Output 21 |
| Reg. 59 | 0E7 | Matrix Bus 'A' Output 22 |
| Reg. 60 | 0E9 | Matrix Bus 'A' Output 23 |
| Reg. 61 | 0EB | Matrix Bus 'A' Output 24 |
| Reg. 62A | 0ED | Matrix Bus 'B' Instrument Input 1 (lower bus bits 4-0) |
| Reg. 62B | 0EF | Matrix Bus 'B' Instrument Input 1 (upper bus bits 9-5) |
| Reg. 63A | 0F1 | Matrix Bus 'B' Instrument Input 2 (lower bus bits 4-0) |
| Reg. 63B | 0F3 | Matrix Bus 'B' Instrument Input 2 (upper bus bits 9-5) |
| Reserved | 0F5-0FF | |
| Reg. 64A | 101 | Matrix Bus 'B' Instrument Input 3 (lower bus bits 4-0) |
| Reg. 64B | 103 | Matrix Bus 'B' Instrument Input 3 (upper bus bits 9-5) |
| Reg. 65A | 105 | Matrix Bus 'B' Instrument Input 4 (lower bus bits 4-0) |

TABLE 0-continued

Control/Status Register Address Offset Assignments

| Control/Status | Address | Function |
|---|---|---|
| Reg. 65B | 107 | Matrix Bus 'B' Instrument Input 4 (upper bus bits 9-5) |
| Reg. 66A | 109 | Matrix Bus 'B' Instrument Input 5 (lower bus bits 4-0) |
| Reg. 66B | 10B | Matrix Bus 'B' Instrument Input 5 (upper bus bits 9-5) |
| Reg. 67A | 10D | Matrix Bus 'B' Instrument Input 6 (lower bus bits 4-0) |
| Reg. 67B | 10F | Matrix Bus 'B' Instrument Input 6 (upper bus bits 9-5) |
| Reg. 68A | 111 | Matrix Bus 'B' Instrument Input 7 (lower bus bits 4-0) |
| Reg. 68B | 113 | Matrix Bus 'B' Instrument Input 7 (upper bus bits 9-5) |
| Reg. 69A | 115 | Matrix Bus 'B' Instrument Input 8 (lower bus bits 4-0) |
| Reg. 69B | 117 | Matrix Bus 'B' Instrument Input 8 (upper bus bits 9-5) |
| Reg. 70 | 119 | Matrix Bus 'B' Output 1 |
| Reg. 71 | 11B | Matrix Bus 'B' Output 2 |
| Reg. 72 | 11D | Matrix Bus 'B' Output 3 |
| Reg. 73 | 11F | Matrix Bus 'B' Output 4 |
| Reg. 74 | 121 | Matrix Bus 'B' Output 5 |
| Reg. 75 | 123 | Matrix Bus 'B' Output 6 |
| Reg. 76 | 125 | Matrix Bus 'B' Output 7 |
| Reg. 77 | 127 | Matrix Bus 'B' Output 8 |
| Reg. 78 | 129 | Matrix Bus 'B' Output 9 |
| Reg. 79 | 12B | Matrix Bus 'B' Output 10 |
| Reg. 80 | 12D | Matrix Bus 'B' Output 11 |
| Reg. 81 | 12F | Matrix Bus 'B' Output 12 |
| Reg. 82 | 131 | Matrix Bus 'B' Output 13 |
| Reg. 83 | 133 | Matrix Bus 'B' Output 14 |
| Reserved | 135-13F | |
| Reg. 84 | 141 | Matrix Bus 'B' Output 15 |
| Reg. 85 | 143 | Matrix Bus 'B' Output 16 |
| Reg. 86 | 145 | Matrix Bus 'B' Output 17 |
| Reg. 87 | 147 | Matrix Bus 'B' Output 18 |
| Reg. 88 | 149 | Matrix Bus 'B' Output 19 |
| Reg. 89 | 14B | Matrix Bus 'B' Output 20 |
| Reg. 90 | 14D | Matrix Bus 'B' Output 21 |
| Reg. 91 | 14F | Matrix Bus 'B' Output 22 |
| Reg. 92 | 151 | Matrix Bus 'B' Output 23 |
| Reg. 93 | 153 | Matrix Bus 'B' Output 24 |
| Reg. 94A | 155 | Matrix Bus 'C' Instrument Input 1 (lower bus bits 4-0) |
| Reg. 94B | 157 | Matrix Bus 'C' Instrument Input 1 (upper bus bits 9-5) |
| Reg. 95A | 159 | Matrix Bus 'C' Instrument Input 2 (lower bus bits 4-0) |
| Reg. 95B | 15B | Matrix Bus 'C' Instrument Input 2 (upper bus bits 9-5) |
| Reg. 96A | 15D | Matrix Bus 'C' Instrument Input 3 (lower bus bits 4-0) |
| Reg. 96B | 15F | Matrix Bus 'C' Instrument Input 3 (upper bus bits 9-5) |
| Reg. 97A | 161 | Matrix Bus 'C' Instrument Input 4 (lower bus bits 4-0) |
| Reg. 97B | 163 | Matrix Bus 'C' Instrument Input 4 (upper bus bits 9-5) |
| Reg. 98A | 165 | Matrix Bus 'C' Instrument Input 5 (lower bus bits 4-0) |
| Reg. 98B | 167 | Matrix Bus 'C' Instrument Input 5 (upper bus bits 9-5) |
| Reg. 99A | 169 | Matrix Bus 'C' Instrument Input 6 (lower bus bits 4-0) |
| Reg. 99B | 16B | Matrix Bus 'C' Instrument Input 6 (upper bus bits 9-5) |
| Reg. 100A | 16D | Matrix Bus 'C' Instrument Input 7 (lower bus bits 4-0) |
| Reg. 100B | 16F | Matrix Bus 'C' Instrument Input 7 (upper bus bits 9-5) |
| Reg. 101A | 171 | Matrix Bus 'C' Instrument Input 8 (lower bus bits 4-0) |
| Reg. 101B | 173 | Matrix Bus 'C' Instrument Input 8 (upper bus bits 9-5) |
| Reserved | 175-17F | |
| Reg. 102 | 181 | Matrix Bus 'C' Output 1 |
| Reg. 103 | 183 | Matrix Bus 'C' Output 2 |
| Reg. 104 | 185 | Matrix Bus 'C' Output 3 |
| Reg. 105 | 187 | Matrix Bus 'C' Output 4 |
| Reg. 106 | 189 | Matrix Bus 'C' Output 5 |
| Reg. 107 | 18B | Matrix Bus 'C' Output 6 |
| Reg. 108 | 18D | Matrix Bus 'C' Output 7 |
| Reg. 109 | 18F | Matrix Bus 'C' Output 8 |
| Reg. 110 | 191 | Matrix Bus 'C' Output 9 |
| Reg. 111 | 193 | Matrix Bus 'C' Output 10 |
| Reg. 112 | 195 | Matrix Bus 'C' Output 11 |
| Reg. 113 | 197 | Matrix Bus 'C' Output 12 |
| Reg. 114 | 199 | Matrix Bus 'C' Output 13 |
| Reg. 115 | 19B | Matrix Bus 'C' Output 14 |
| Reg. 116 | 19D | Matrix Bus 'C' Output 15 |
| Reg. 117 | 19F | Matrix Bus 'C' Output 16 |
| Reg. 118 | 1A1 | Matrix Bus 'C' Output 17 |
| Reg. 119 | 1A3 | Matrix Bus 'C' Output 18 |
| Reg. 120 | 1A5 | Matrix Bus 'C' Output 19 |
| Reg. 121 | 1A7 | Matrix Bus 'C' Output 20 |
| Reg. 122 | 1A9 | Matrix Bus 'C' Output 21 |
| Reg. 123 | 1AB | Matrix Bus 'C' Output 22 |
| Reg. 124 | 1AD | Matrix Bus 'C' Output 23 |
| Reg. 125 | 1AF | Matrix Bus 'C' Output 24 |
| ID Byte | 201 | Identification Byte (Read Only) |
| EPROM | 203 | EPROM Data (Read Only) |

TABLE 4

Control/Status Register Relay Assignments

| Control/Status Register | Bit 7 (MSB) | Bit 6 | Bit 5 | Bit 4 | Bit 3 | Bit 2 | Bit 1 | Bit 0 (LSB) |
|---|---|---|---|---|---|---|---|---|
| | | | | Input Bus to Matrix Bus 'A' (lower bus bits 4-0) | | | | |
| Reg. 00A | NC | NC | NC | K5<br>Bus 4 | K4<br>Bus 3 | K3<br>Bus 2 | K2<br>Bus 1 | K1<br>Bus 0 |
| | | | | Input Bus to Matrix Bus 'A' (upper bus bits 9-5) | | | | |
| Reg. 00B | NC | NC | NC | K15<br>Bus 9 | K14<br>Bus 8 | K13<br>Bus 7 | K12<br>Bus 6 | K11<br>Bus 5 |
| | | | | Bypass Matrix Bus 'A' to Internal Bus 'B' (lower bus bits 4-0) | | | | |
| Reg. 01A | NC | NC | NC | K10<br>Bus 4 | K9<br>Bus 3 | K8<br>Bus 2 | K7<br>Bus 1 | K6<br>Bus 0 |
| | | | | Bypass Matrix Bus 'A' to Internal Bus 'B' (upper bus bits 9-5) | | | | |
| Reg. 01B | NC | NC | NC | K20<br>Bus 9 | K19<br>Bus 8 | K18<br>Bus 7 | K17<br>Bus 6 | K16<br>Bus 5 |
| | | | | Internal Bus 'B' to Matrix Bus 'B' (lower bus bits 4-0) | | | | |
| Reg. 02A | NC | NC | NC | K25<br>Bus 4 | K24<br>Bus 3 | K23<br>Bus 2 | K22<br>Bus 1 | K21<br>Bus 0 |
| | | | | Internal Bus 'B' to Matrix Bus 'B' (upper bus bits 9-5) | | | | |
| Reg. 02B | NC | NC | NC | K35<br>Bus 9 | K34<br>Bus 8 | K33<br>Bus 7 | K32<br>Bus 6 | K31<br>Bus 5 |
| | | | | Bypass Matrix Bus 'B' to Internal Bus 'C' (lower bus bits 4-0) | | | | |
| Reg. 03A | NC | NC | NC | K30<br>Bus 4 | K29<br>Bus 3 | K28<br>Bus 2 | K27<br>Bus 1 | K26<br>Bus 0 |
| | | | | Bypass Matrix Bus 'B' to Internal Bus 'C' (upper bus bits 9-5) | | | | |
| Reg. 03B | NC | NC | NC | K40<br>Bus 9 | K39<br>Bus 8 | K38<br>Bus 7 | K37<br>Bus 6 | K36<br>Bus 5 |
| | | | | Internal Bus 'C' to Matrix Bus 'C' (lower bus bits 4-0) | | | | |
| Reg. 04A | NC | NC | NC | K45<br>Bus 4 | K44<br>Bus 3 | K43<br>Bus 2 | K42<br>Bus 1 | K41<br>Bus 0 |
| | | | | Internal Bus 'C' to Matrix Bus 'C' (upper bus bits 9-5) | | | | |
| Reg. 04B | NC | NC | NC | K55<br>Bus 9 | K54<br>Bus 8 | K53<br>Bus 7 | K52<br>Bus 6 | K51<br>Bus 5 |
| | | | | Bypass Matrix Bus 'C' to Output Bus (lower bus bits 4-0) | | | | |
| Reg. 05A | NC | NC | NC | K50<br>Bus 4 | K49<br>Bus 3 | K48<br>Bus 2 | K47<br>Bus 1 | K46<br>Bus 0 |
| | | | | Bypass Matrix Bus 'C' to Output Bus (upper bus bits 9-5) | | | | |
| Reg. 05B | NC | NC | NC | K60<br>Bus 9 | K59<br>Bus 8 | K58<br>Bus 7 | K57<br>Bus 6 | K56<br>Bus 5 |
| | | | | Matrix Bus 'A' Stub Break 1 (lower bus bits 4-0) | | | | |
| Reg. 06A | NC | NC | NC | K65<br>Bus 4 | K64<br>Bus 3 | K63<br>Bus 2 | K62<br>Bus 1 | K61<br>Bus 0 |
| | | | | Matrix Bus 'A' Stub Break 1 (upper bus bits 9-5) | | | | |
| Reg. 06B | NC | NC | NC | K85<br>Bus 9 | K84<br>Bus 8 | K83<br>Bus 7 | K82<br>Bus 6 | K81<br>Bus 5 |
| | | | | Matrix Bus 'A' Stub Break 2 (lower bus bits 4-0) | | | | |
| Reg. 07A | NC | NC | NC | K70<br>Bus 4 | K69<br>Bus 3 | K68<br>Bus 2 | K67<br>Bus 1 | K66<br>Bus 0 |
| | | | | Matrix Bus 'A' Stub Break 2 (upper bus bits 9-5) | | | | |
| Reg. 07B | NC | NC | NC | K90<br>Bus 9 | K89<br>Bus 8 | K88<br>Bus 7 | K87<br>Bus 6 | K86<br>Bus 5 |
| | | | | Matrix Bus 'A' Stub Break 3 (lower bus bits 4-0) | | | | |
| Reg. 08A | NC | NC | NC | K79<br>Bus 4 | K77<br>Bus 3 | K75<br>Bus 2 | K73<br>Bus 1 | K71<br>Bus 0 |
| | | | | Matrix Bus 'A' Stub Break 3 (upper bus bits 9-5) | | | | |
| Reg. 08B | NC | NC | NC | K99<br>Bus 9 | K97<br>Bus 8 | K95<br>Bus 7 | K93<br>Bus 6 | K91<br>Bus 5 |

TABLE 4-continued

Control/Status Register Relay Assignments

| Control/Status Register | Bit 7 (MSB) | Bit 6 | Bit 5 | Bit 4 | Bit 3 | Bit 2 | Bit 1 | Bit 0 (LSB) |
|---|---|---|---|---|---|---|---|---|
| | | | | Matrix Bus 'A' Stub Break 4 (lower bus bits 4-0) | | | | |
| Reg. 09A | NC | NC | NC | K80 Bus 4 | K78 Bus 3 | K76 Bus 2 | K74 Bus 1 | K72 Bus 0 |
| | | | | Matrix Bus 'A' Stub Break 4 (upper bus bits 9-5) | | | | |
| Reg. 09B | NC | NC | NC | K100 Bus 9 | K98 Bus 8 | K96 Bus 7 | K94 Bus 6 | K92 Bus 5 |
| | | | | Matrix Bus 'B' Stub Break 1 (lower bus bits 4-0) | | | | |
| Reg. 10A | NC | NC | NC | K105 Bus 4 | K104 Bus 3 | K103 Bus 2 | K102 Bus 1 | K101 Bus 0 |
| | | | | Matrix Bus 'B' Stub Break 1 (upper bus bits 9-5) | | | | |
| Reg. 10B | NC | NC | NC | K125 Bus 9 | K124 Bus 8 | K123 Bus 7 | K122 Bus 6 | K121 Bus 5 |
| | | | | Matrix Bus 'B' Stub Break 2 (lower bus bits 4-0) | | | | |
| Reg. 11A | NC | NC | NC | K110 Bus 4 | K109 Bus 3 | K108 Bus 2 | K107 Bus 1 | K106 Bus 0 |
| | | | | Matrix Bus 'B' Stub Break 2 (upper bus bits 9-5) | | | | |
| Reg. 11B | NC | NC | NC | K130 Bus 9 | K129 Bus 8 | K128 Bus 7 | K127 Bus 6 | K126 Bus 5 |
| | | | | Matrix Bus 'B' Stub Break 3 (lower bus bits 4-0) | | | | |
| Reg. 12A | NC | NC | NC | K119 Bus 4 | K117 Bus 3 | K115 Bus 2 | K113 Bus 1 | K111 Bus 0 |
| | | | | Matrix Bus 'B' Stub Break 3 (upper bus bits 9-5) | | | | |
| Reg. 12B | NC | NC | NC | K139 Bus 9 | K137 Bus 8 | K135 Bus 7 | K133 Bus 6 | K131 Bus 5 |
| | | | | Matrix Bus 'B' Stub Break 4 (lower bus bits 4-0) | | | | |
| Reg. 13A | NC | NC | NC | K120 Bus 4 | K118 Bus 3 | K116 Bus 2 | K114 Bus 1 | K112 Bus 0 |
| | | | | Matrix Bus 'B' Stub Break 4 (upper bus bits 9-5) | | | | |
| Reg. 13B | NC | NC | NC | K140 Bus 9 | K138 Bus 8 | K136 Bus 7 | K134 Bus 6 | K132 Bus 5 |
| | | | | Matrix Bus 'C' Stub Break 1 (lower bus bits 4-0) | | | | |
| Reg. 14A | NC | NC | NC | K145 Bus 4 | K144 Bus 3 | K143 Bus 2 | K142 Bus 1 | K141 Bus 0 |
| | | | | Matrix Bus 'C' Stub Break 1 (upper bus bits 9-5) | | | | |
| Reg. 14B | NC | NC | NC | K165 Bus 9 | K164 Bus 8 | K163 Bus 7 | K162 Bus 6 | K161 Bus 5 |
| | | | | Matrix Bus 'C' Stub Break 2 (lower bus bits 4-0) | | | | |
| Reg. 15A | NC | NC | NC | K150 Bus 4 | K149 Bus 3 | K148 Bus 2 | K147 Bus 1 | K146 Bus 0 |
| | | | | Matrix Bus 'C' Stub Break 2 (upper bus bits 9-5) | | | | |
| Reg. 15B | NC | NC | NC | K170 Bus 9 | K169 Bus 8 | K168 Bus 7 | K167 Bus 6 | K166 Bus 5 |
| | | | | Matrix Bus 'C' Stub Break 3 (lower bus bits 4-0) | | | | |
| Reg. 16A | NC | NC | NC | K159 Bus 4 | K157 Bus 3 | K155 Bus 2 | K153 Bus 1 | K151 Bus 0 |
| | | | | Matrix Bus 'C' Stub Break 3 (upper bus bits 9-5) | | | | |
| Reg. 16B | NC | NC | NC | K179 Bus 9 | K177 Bus 8 | K175 Bus 7 | K173 Bus 6 | K171 Bus 5 |
| | | | | Matrix Bus 'C' Stub Break 4 (lower bus bits 4-0) | | | | |
| Reg. 17A | NC | NC | NC | K160 Bus 4 | K158 Bus 3 | K156 Bus 2 | K154 Bus 1 | K152 Bus 0 |
| | | | | Matrix Bus 'C' Stub Break 4 (upper bus bits 9-5) | | | | |
| Reg. 17B | NC | NC | NC | K180 Bus 9 | K178 Bus 8 | K176 Bus 7 | K174 Bus 6 | K172 Bus 5 |

TABLE 4-continued

Control/Status Register Relay Assignments

| Control/Status Register | Bit 7 (MSB) | Bit 6 | Bit 5 | Bit 4 | Bit 3 | Bit 2 | Bit 1 | Bit 0 (LSB) |
|---|---|---|---|---|---|---|---|---|
| | | | | Matrix Bus 'A' Pull-up/Pull-down for Load 1 | | | | |
| Reg. 18A | NC | NC | NC | K185 Bus 4 | K184 Bus 3 | K183 Bus 2 | K182 Bus 1 | K181 Bus 0 |
| | | | | Matrix Bus 'A' Pull-up/Pull-down for Load 2 | | | | |
| Reg. 18B | NC | NC | NC | K195 Bus 9 | K194 Bus 8 | K193 Bus 7 | K192 Bus 6 | K191 Bus 5 |
| | | | | Matrix Bus 'A' Resistor Selection for Load 1 | | | | |
| Reg. 19A | NC | NC | NC | K190 Bus 4 | K189 Bus 3 | K188 Bus 2 | K187 Bus 1 | K186 Bus 0 |
| | | | | Matrix Bus 'A' Resistor Selection for Load 2 | | | | |
| Reg. 19B | NC | NC | NC | K200 Bus 9 | K199 Bus 8 | K198 Bus 7 | K197 Bus 6 | K196 Bus 5 |
| | | | | Matrix Bus 'A' Load 1 Connection (lower bus bits 4-0) | | | | |
| Reg. 20A | NC | NC | NC | K205 Bus 4 | K204 Bus 3 | K203 Bus 2 | K202 Bus 1 | K201 Bus 0 |
| | | | | Matrix Bus 'A' Load 1 Connection (upper bus bits 9-5) | | | | |
| Reg. 20B | NC | NC | NC | K210 Bus 9 | K209 Bus 8 | K208 Bus 7 | K207 Bus 6 | K206 Bus 5 |
| | | | | Matrix Bus 'A' Load 2 Connection (lower bus bits 4-0) | | | | |
| Reg. 21A | NC | NC | NC | K215 Bus 4 | K214 Bus 3 | K213 Bus 2 | K212 Bus 1 | K211 Bus 0 |
| | | | | Matrix Bus 'A' Load 2 Connection (upper bus bits 9-5) | | | | |
| Reg. 21B | NC | NC | NC | K220 Bus 9 | K219 Bus 8 | K218 Bus 7 | K217 Bus 6 | K216 Bus 5 |
| | | | | Matrix Bus 'B' Pull-up/Pull-down for Load 1 | | | | |
| Reg. 22A | NC | NC | NC | K225 Bus 4 | K224 Bus 3 | K223 Bus 2 | K222 Bus 1 | K221 Bus 0 |
| | | | | Matrtx Bus 'B' Pull-up/Pull-down for Load 2 | | | | |
| Reg. 22B | NC | NC | NC | K235 Bus 9 | K234 Bus 8 | K233 Bus 7 | K232 Bus 6 | K231 Bus 5 |
| | | | | Matrix Bus 'B' Resistor Selection for Load 1 | | | | |
| Reg. 23A | NC | NC | NC | K230 Bus 4 | K229 Bus 3 | K228 Bus 2 | K227 Bus 1 | K226 Bus 0 |
| | | | | Matrix Bus 'B' Resistor Selection for Load 2 | | | | |
| Reg. 23B | NC | NC | NC | K240 Bus 9 | K239 Bus 8 | K238 Bus 7 | K237 Bus 6 | K236 Bus 5 |
| | | | | Matrix Bus 'B' Load 1 Connection (lower bus bits 4-0) | | | | |
| Reg. 24A | NC | NC | NC | K245 Bus 4 | K244 Bus 3 | K243 Bus 2 | K242 Bus 1 | K241 Bus 0 |
| | | | | Matrix Bus 'B' Load 1 Connection (upper bus bits 9-5) | | | | |
| Reg. 24B | NC | NC | NC | K250 Bus 9 | K249 Bus 8 | K248 Bus 7 | K247 Bus 6 | K246 Bus 5 |
| | | | | Matrix Bus 'B' Load 2 Connection (lower bus bits 4-0) | | | | |
| Reg. 25A | NC | NC | NC | K255 Bus 4 | K254 Bus 3 | K253 Bus 2 | K252 Bus 1 | K251 Bus 0 |
| | | | | Matrix Bus 'B' Load 2 Connection (upper bus bits 9-5) | | | | |
| Reg. 25B | NC | NC | NC | K260 Bus 9 | K259 Bus 8 | K258 Bus 7 | K257 Bus 6 | K256 Bus 5 |
| | | | | Matrix Bus 'C' Pull-up/Pull-down for Load 1 | | | | |
| Reg. 26A | NC | NC | NC | K265 Bus 4 | K264 Bus 3 | K263 Bus 2 | K262 Bus 1 | K261 Bus 0 |
| | | | | Matrix Bus 'C' Pull-up/Pull-down for Load 2 | | | | |
| Reg. 26B | NC | NC | NC | K275 Bus 9 | K274 Bus 8 | K273 Bus 7 | K272 Bus 6 | K271 Bus 5 |

TABLE 4-continued

Control/Status Register Relay Assignments

| Control/Status Register | Bit 7 (MSB) | Bit 6 | Bit 5 | Bit 4 | Bit 3 | Bit 2 | Bit 1 | Bit 0 (LSB) |
|---|---|---|---|---|---|---|---|---|
| Matrix Bus 'C' Resistor Selection for Load 1 | | | | | | | | |
| Reg. 27A | NC | NC | NC | K270 Bus 4 | K269 Bus 3 | K268 Bus 2 | K267 Bus 1 | K266 Bus 0 |
| Matrix Bus 'C' Resistor Selection for Load 2 | | | | | | | | |
| Reg. 27B | NC | NC | NC | K280 Bus 9 | K279 Bus 8 | K278 Bus 7 | K277 Bus 6 | K276 Bus 5 |
| Matrix Bus 'C' Load 1 Connection (lower bus bits 4-0) | | | | | | | | |
| Reg. 28A | NC | NC | NC | K285 Bus 4 | K284 Bus 3 | K283 Bus 2 | K282 Bus 1 | K281 Bus 0 |
| Matrix Bus 'C' Load 1 Connection (upper bus bits 9-5) | | | | | | | | |
| Reg. 28B | NC | NC | NC | K290 Bus 9 | K289 Bus 8 | K288 Bus 7 | K287 Bus 6 | K286 Bus 5 |
| Matrix Bus 'C' Load 2 Connection (lower bus bits 4-0) | | | | | | | | |
| Reg. 29A | NC | NC | NC | K295 Bus 4 | K294 Bus 3 | K293 Bus 2 | K292 Bus 1 | K291 Bus 0 |
| Matrix Bus 'C' Load 2 Connection (upper bus bits 9-5) | | | | | | | | |
| Reg. 29B | NC | NC | NC | K300 Bus 9 | K299 Bus 8 | K298 Bus 7 | K297 Bus 6 | K296 Bus 5 |
| Matrix Bus 'A' Instrument Input 1 (lower bus bits 4-0) | | | | | | | | |
| Reg. 30A | NC | NC | NC | K305 Bus 4 | K304 Bus 3 | K303 Bus 2 | K302 Bus 1 | K301 Bus 0 |
| Matrix Bus 'A' Instrument Input 1 (upper bus bits 9-5) | | | | | | | | |
| Reg. 30B | NC | NC | NC | K310 Bus 9 | K309 Bus 8 | K308 Bus 7 | K307 Bus 6 | K306 Bus 5 |
| Matrix Bus 'A' Instrument Input 2 (lower bus bits 4-0) | | | | | | | | |
| Reg. 31A | NC | NC | NC | K315 Bus 4 | K314 Bus 3 | K313 Bus 2 | K312 Bus 1 | K311 Bus 0 |
| Matrix Bus 'A' Instrument Input 2 (upper bus bits 9-5) | | | | | | | | |
| Reg. 31B | NC | NC | NC | K320 Bus 9 | K319 Bus 8 | K318 Bus 7 | K317 Bus 6 | K316 Bus 5 |
| Matrix Bus 'A' Instrument Input 3 (lower bus bits 4-0) | | | | | | | | |
| Reg. 32A | NC | NC | NC | K325 Bus 4 | K324 Bus 3 | K323 Bus 2 | K322 Bus 1 | K321 Bus 0 |
| Matrix Bus 'A' Instrument Input 3 (upper bus bits 9-5) | | | | | | | | |
| Reg. 32B | NC | NC | NC | K330 Bus 9 | K329 Bus 8 | K328 Bus 7 | K327 Bus 6 | K326 Bus 5 |
| Matrix Bus 'A' Instrument Input 4 (lower bus bits 4-0) | | | | | | | | |
| Reg. 33A | NC | NC | NC | K335 Bus 4 | K334 Bus 3 | K333 Bus 2 | K332 Bus 1 | K331 Bus 0 |
| Matrix Bus 'A' Instrument Input 4 (upper bus bits 9-5) | | | | | | | | |
| Reg. 33B | NC | NC | NC | K340 Bus 9 | K339 Bus 8 | K338 Bus 7 | K337 Bus 6 | K336 Bus 5 |
| Matrix Bus 'A' instrument Input 5 (lower bus bits 4-0) | | | | | | | | |
| Reg. 34A | NC | NC | NC | K345 Bus 4 | K344 Bus 3 | K343 Bus 2 | K342 Bus 1 | K341 Bus 0 |
| Matrix Bus 'A' Instrument Input 5 (upper bus bits 9-5) | | | | | | | | |
| Reg. 34B | NC | NC | NC | K350 Bus 9 | K349 Bus 8 | K348 Bus 7 | K347 Bus 6 | K346 Bus 5 |
| Matrix Bus 'A' Instrument Input 6 (lower bus bits 4-0) | | | | | | | | |
| Reg. 35A | NC | NC | NC | K355 Bus 4 | K354 Bus 3 | K353 Bus 2 | K352 Bus 1 | K351 Bus 0 |
| Matrix Bus 'A' Instrument Input 6 (upper bus bits 9-5) | | | | | | | | |
| Reg. 35B | NC | NC | NC | K360 Bus 9 | K359 Bus 8 | K358 Bus 7 | K357 Bus 6 | K356 Bus 5 |

TABLE 4-continued

Control/Status Register Relay Assignments

| Control/Status Register | Bit 7 (MSB) | Bit 6 | Bit 5 | Bit 4 | Bit 3 | Bit 2 | Bit 1 | Bit 0 (LSB) |
|---|---|---|---|---|---|---|---|---|
| | | | | Matrix Bus 'A' Instrument Input 7 (lower bus bits 4-0) | | | | |
| Reg. 36A | NC | NC | NC | K365 Bus 4 | K364 Bus 3 | K363 Bus 2 | K362 Bus 1 | K361 Bus 0 |
| | | | | Matrix Bus 'A' Instrument Input 7 (upper bus bits 9-5) | | | | |
| Reg. 36B | NC | NC | NC | K370 Bus 9 | K369 Bus 8 | K368 Bus 7 | K367 Bus 6 | K366 Bus 5 |
| | | | | Matrix Bus 'A' Instrument Input 8 (lower bus bits 4-0) | | | | |
| Reg. 37A | NC | NC | NC | K375 Bus 4 | K374 Bus 3 | K373 Bus 2 | K372 Bus 1 | K371 Bus 0 |
| | | | | Matrix Bus 'A' Instrument Input 8 (upper bus bits 9-5) | | | | |
| Reg. 37B | NC | NC | NC | K380 Bus 9 | K379 Bus 8 | K378 Bus 7 | K377 Bus 6 | K376 Bus 5 |
| | | | | Matrix Bus 'A' Output 1 | | | | |
| Reg. 38 | NC | NC | NC | K385 Bus 4 | K384 Bus 3 | K383 Bus 2 | K382 Bus 1 | K381 Bus 0 |
| | | | | Matrix Bus 'A' Output 2 | | | | |
| Reg. 39 | NC | NC | NC | K390 Bus 7 | K389 Bus 3 | K388 Bus 2 | K387 Bus 1 | K386 Bus 0 |
| | | | | Matrix Bus 'A' Output 3 | | | | |
| Reg. 40 | NC | NC | NC | K395 Bus 6 | K394 Bus 3 | K393 Bus 2 | K392 Bus 1 | K391 Bus 0 |
| | | | | Matrix Bus 'A' Output 4 | | | | |
| Reg. 41 | NC | NC | NC | K400 Bus 6 | K399 Bus 4 | K398 Bus 2 | K397 Bus 1 | K396 Bus 0 |
| | | | | Matrix Bus 'A' Output 5 | | | | |
| Reg. 42 | NC | NC | NC | K405 Bus 5 | K404 Bus 4 | K403 Bus 2 | K402 Bus 1 | K401 Bus 0 |
| | | | | Matrix Bus 'A' Output 6 | | | | |
| Reg. 43 | NC | NC | NC | K410 Bus 5 | K409 Bus 3 | K408 Bus 2 | K407 Bus 1 | K406 Bus 0 |
| | | | | Matrix Bus 'A' Output 7 | | | | |
| Reg. 44 | NC | NC | NC | K415 Bus 7 | K414 Bus 6 | K413 Bus 2 | K412 Bus 1 | K411 Bus 0 |
| | | | | Matrix Bus 'A' Output 8 | | | | |
| Reg. 45 | NC | NC | NC | K420 Bus 7 | K419 Bus 4 | K418 Bus 2 | K417 Bus 1 | K416 Bus 0 |
| | | | | Matrix Bus 'A' Output 9 | | | | |
| Reg. 46 | NC | NC | NC | K425 Bus 7 | K424 Bus 5 | K423 Bus 2 | K422 Bus 1 | K421 Bus 0 |
| | | | | Matrix Bus 'A' Output 10 | | | | |
| Reg. 47 | NC | NC | NC | K430 Bus 5 | K429 Bus 4 | K428 Bus 3 | K427 Bus 1 | K426 Bus 0 |
| | | | | Matrix Bus 'A' Output 11 | | | | |
| Reg. 48 | NC | NC | NC | K435 Bus 6 | K434 Bus 4 | K433 Bus 3 | K432 Bus 1 | K431 Bus 0 |
| | | | | Matrix Bus 'A' Output 12 | | | | |
| Reg. 49 | NC | NC | NC | K440 Bus 6 | K439 Bus 5 | K438 Bus 2 | K437 Bus 1 | K436 Bus 0 |
| | | | | Matrix Bus 'A' Output 13 | | | | |
| Reg. 50 | NC | NC | NC | K445 Bus 6 | K444 Bus 4 | K443 Bus 3 | K442 Bus 2 | K441 Bus 0 |
| | | | | Matrix Bus 'A' Output 14 | | | | |
| Reg. 51 | NC | NC | NC | K450 Bus 7 | K449 Bus 4 | K448 Bus 3 | K447 Bus 2 | K446 Bus 0 |

TABLE 4-continued

Control/Status Register Relay Assignments

| Control/Status Register | Bit 7 (MSB) | Bit 6 | Bit 5 | Bit 4 | Bit 3 | Bit 2 | Bit 1 | Bit 0 (LSB) |
|---|---|---|---|---|---|---|---|---|
| | | | | Matrix Bus 'A' Output 15 | | | | |
| Reg. 52 | NC | NC | NC | K455 Bus 8 | K454 Bus 4 | K453 Bus 3 | K452 Bus 2 | K451 Bus 0 |
| | | | | Matrix Bus 'A' Output 16 | | | | |
| Reg. 53 | NC | NC | NC | K460 Bus 8 | K459 Bus 5 | K458 Bus 3 | K457 Bus 2 | K456 Bus 0 |
| | | | | Matrix Bus 'A' Output 17 | | | | |
| Reg. 54 | NC | NC | NC | K465 Bus 7 | K464 Bus 5 | K463 Bus 3 | K462 Bus 2 | K461 Bus 0 |
| | | | | Matrix Bus 'A' Output 18 | | | | |
| Reg. 55 | NC | NC | NC | K470 Bus 6 | K469 Bus 5 | K468 Bus 3 | K467 Bus 2 | K466 Bus 0 |
| | | | | Matrix Bus 'A' Output 19 | | | | |
| Reg. 56 | NC | NC | NC | K475 Bus 8 | K474 Bus 3 | K473 Bus 2 | K472 Bus 1 | K471 Bus 0 |
| | | | | Matrix Bus 'A' Output 20 | | | | |
| Reg. 57 | NC | NC | NC | K480 Bus 8 | K479 Bus 6 | K478 Bus 4 | K477 Bus 1 | K476 Bus 0 |
| | | | | Matrix Bus 'A' Output 21 | | | | |
| Reg. 58 | NC | NC | NC | K485 Bus 7 | K484 Bus 4 | K483 Bus 3 | K482 Bus 1 | K481 Bus 0 |
| | | | | Matrix Bus 'A' Output 22 | | | | |
| Reg. 59 | NC | NC | NC | K490 Bus 7 | K489 Bus 6 | K488 Bus 3 | K487 Bus 1 | K486 Bus 0 |
| | | | | Matrix Bus 'A' Output 23 | | | | |
| Reg. 60 | NC | NC | NC | K495 Bus 6 | K494 Bus 5 | K493 Bus 3 | K492 Bus 1 | K491 Bus 0 |
| | | | | Matrix Bus 'A' Output 24 | | | | |
| Reg. 61 | NC | NC | NC | K500 Bus 7 | K499 Bus 5 | K498 Bus 3 | K497 Bus 1 | K496 Bus 0 |
| | | | | Matrix Bus 'B' Instrument Input 1 (lower bus bits 4-0) | | | | |
| Reg. 62A | NC | NC | NC | K505 Bus 4 | K504 Bus 3 | K503 Bus 2 | K502 Bus 1 | K501 Bus 0 |
| | | | | Matrix Bus 'B' Instrument Input 1 (upper bus bits 9-5) | | | | |
| Reg. 62B | NC | NC | NC | K510 Bus 9 | K509 Bus 8 | K508 Bus 7 | K507 Bus 6 | K506 Bus 5 |
| | | | | Matrix Bus 'B' Instrument Input 2 (lower bus bits 4-0) | | | | |
| Reg. 63A | NC | NC | NC | K515 Bus 4 | K514 Bus 3 | K513 Bus 2 | K512 Bus 1 | K511 Bus 0 |
| | | | | Matrix Bus 'B' Instrument Input 2 (upper bus bits 9-5) | | | | |
| Reg. 63B | NC | NC | NC | K520 Bus 9 | K519 Bus 8 | K518 Bus 7 | K517 Bus 6 | K516 Bus 5 |
| | | | | Matrix Bus 'B' instrument Input 3 (lower bus bits 4-0) | | | | |
| Reg. 64A | NC | NC | NC | K525 Bus 4 | K524 Bus 3 | K523 Bus 2 | K522 Bus 1 | K521 Bus 0 |
| | | | | Matrix Bus 'B' instrument Input 3 (upper bus bits 9-5) | | | | |
| Reg. 64B | NC | NC | NC | K530 Bus 9 | K529 Bus 8 | K528 Bus 7 | K527 Bus 6 | K526 Bus 5 |
| | | | | Matrix Bus 'B' Instrument Input 4 (lower bus bits 4-0) | | | | |
| Reg. 65A | NC | NC | NC | K535 Bus 4 | K534 Bus 3 | K533 Bus 2 | K532 Bus 1 | K531 Bus 0 |
| | | | | Matrtx Bus 'B' Instrument Input 4 (upper bus bits 9-5) | | | | |
| Reg. 65B | NC | NC | NC | K540 Bus 9 | K539 Bus 8 | K538 Bus 7 | K537 Bus 6 | K536 Bus 5 |

TABLE 4-continued

Control/Status Register Relay Assignments

| Control/Status Register | Bit 7 (MSB) | Bit 6 | Bit 5 | Bit 4 | Bit 3 | Bit 2 | Bit 1 | Bit 0 (LSB) |
|---|---|---|---|---|---|---|---|---|
| | | | | Matrix Bus 'B' Instrument Input 5 (lower bus bits 4-0) | | | | |
| Reg. 66A | NC | NC | NC | K545 Bus 4 | K544 Bus 3 | K543 Bus 2 | K542 Bus 1 | K541 Bus 0 |
| | | | | Matrix Bus 'B' Instrument Input 5 (upper bus bits 9-5) | | | | |
| Reg. 66B | NC | NC | NC | K550 Bus 9 | K549 Bus 8 | K548 Bus 7 | K547 Bus 6 | K546 Bus 5 |
| | | | | Matrtx Bus 'B' Instrument Input 6 (lower bus bits 4-0) | | | | |
| Reg. 67A | NC | NC | NC | K555 Bus 4 | K554 Bus 3 | K553 Bus 2 | K552 Bus 1 | K551 Bus 0 |
| | | | | Matrix Bus 'B' Instrument Input 6 (upper bus bits 9-5) | | | | |
| Reg. 67B | NC | NC | NC | K560 Bus 9 | K559 Bus 8 | K558 Bus 7 | K557 Bus 6 | K556 Bus 5 |
| | | | | Matrix Bus 'B' Instrument Input 7 (lower bus bits 4-0) | | | | |
| Reg. 68A | NC | NC | NC | K565 Bus 4 | K564 Bus 3 | K563 Bus 2 | K562 Bus 1 | K561 Bus 0 |
| | | | | Matrix Bus 'B' Instrument Input 7 (upper bus bits 9-5) | | | | |
| Reg. 68B | NC | NC | NC | Bus 9 K570 | Bus 8 K569 | Bus 7 K568 | Bus 6 K567 | Bus 5 K566 |
| | | | | Matrix Bus 'B' Instrument Input 8 (lower bus bits 4-0) | | | | |
| Reg. 69A | NC | NC | NC | K575 Bus 4 | K574 Bus 3 | K573 Bus 2 | K572 Bus 1 | K571 Bus 0 |
| | | | | Matrix Bus 'B' Instrument Input 8 (upper bus bits 9-5) | | | | |
| Reg. 69B | NC | NC | NC | K580 Bus 9 | K579 Bus 8 | K578 Bus 7 | K577 Bus 6 | K576 Bus 5 |
| | | | | Matrix Bus 'B' Output 1 | | | | |
| Reg. 70 | NC | NC | NC | K585 Bus 5 | K584 Bus 4 | K583 Bus 3 | K582 Bus 2 | K581 Bus 1 |
| | | | | Matrix Bus 'B' Output 2 | | | | |
| Reg. 71 | NC | NC | NC | K590 Bus 8 | K589 Bus 4 | K588 Bus 3 | K587 Bus 2 | K586 Bus 1 |
| | | | | Matrix Bus 'B' Output 3 | | | | |
| Reg. 72 | NC | NC | NC | K595 Bus 7 | K594 Bus 4 | K593 Bus 3 | K592 Bus 2 | K591 Bus 1 |
| | | | | Matrix Bus 'B' Output 4 | | | | |
| Reg. 73 | NC | NC | NC | K600 Bus 7 | K599 Bus 5 | K598 Bus 3 | K597 Bus 2 | K596 Bus 1 |
| | | | | Matrix Bus 'B' Output 5 | | | | |
| Reg. 74 | NC | NC | NC | K605 Bus 6 | K604 Bus 5 | K603 Bus 3 | K602 Bus 2 | K601 Bus 1 |
| | | | | Matrix Bus 'B' Output 6 | | | | |
| Reg. 75 | NC | NC | NC | K610 Bus 6 | K609 Bus 4 | K608 Bus 3 | K607 Bus 2 | K606 Bus 1 |
| | | | | Matrix Bus 'B' Output 7 | | | | |
| Reg. 76 | NC | NC | NC | K615 Bus 8 | K614 Bus 7 | K613 Bus 3 | K612 Bus 2 | K611 Bus 1 |
| | | | | Matrix Bus 'B' Output 8 | | | | |
| Reg. 77 | NC | NC | NC | K620 Bus 8 | K619 Bus 5 | K618 Bus 3 | K617 Bus 2 | K616 Bus 1 |
| | | | | Matrix Bus 'B' Output 9 | | | | |
| Reg. 78 | NC | NC | NC | K625 Bus 8 | K624 Bus 6 | K623 Bus 3 | K622 Bus 2 | K621 Bus 1 |
| | | | | Matrix Bus 'B' Output 10 | | | | |
| Reg. 79 | NC | NC | NC | K630 Bus 6 | K629 Bus 5 | K628 Bus 4 | K627 Bus 2 | K626 Bus 1 |

TABLE 4-continued

Control/Status Register Relay Assignments

| Control/Status Register | Bit 7 (MSB) | Bit 6 | Bit 5 | Bit 4 | Bit 3 | Bit 2 | Bit 1 | Bit 0 (LSB) |
|---|---|---|---|---|---|---|---|---|
| | | | | Matrix Bus 'B' Output 11 | | | | |
| Reg. 80 | NC | NC | NC | K635<br>Bus 7 | K634<br>Bus 5 | K633<br>Bus 4 | K632<br>Bus 2 | K631<br>Bus 1 |
| | | | | Matrix Bus 'B' Output 12 | | | | |
| Reg. 81 | NC | NC | NC | K640<br>Bus 7 | K639<br>Bus 6 | K638<br>Bus 3 | K637<br>Bus 2 | K636<br>Bus 1 |
| | | | | Matrix Bus 'B' Output 13 | | | | |
| Reg. 82 | NC | NC | NC | K645<br>Bus 7 | K644<br>Bus 5 | K643<br>Bus 4 | K642<br>Bus 3 | K641<br>Bus 1 |
| | | | | Matrix Bus 'B' Output 14 | | | | |
| Reg. 83 | NC | NC | NC | K650<br>Bus 8 | K649<br>Bus 5 | K648<br>Bus 4 | K647<br>Bus 3 | K646<br>Bus 1 |
| | | | | Matrix Bus 'B' Output 15 | | | | |
| Reg. 84 | NC | NC | NC | K655<br>Bus 9 | K654<br>Bus 5 | K653<br>Bus 4 | K652<br>Bus 3 | K651<br>Bus 1 |
| | | | | Matrix Bus 'B' Output 16 | | | | |
| Reg. 85 | NC | NC | NC | K660<br>Bus 9 | K659<br>Bus 6 | K658<br>Bus 4 | K657<br>Bus 3 | K656<br>Bus 1 |
| | | | | Matrix Bus 'B' Output 17 | | | | |
| Reg. 86 | NC | NC | NC | K665<br>Bus 8 | K664<br>Bus 6 | K663<br>Bus 4 | K662<br>Bus 3 | K661<br>Bus 1 |
| | | | | Matrix Bus 'B' Output 18 | | | | |
| Reg. 87 | NC | NC | NC | K670<br>Bus 7 | K669<br>Bus 6 | K668<br>Bus 4 | K667<br>Bus 3 | K666<br>Bus 1 |
| | | | | Matrix Bus 'B' Output 19 | | | | |
| Reg. 88 | NC | NC | NC | K675<br>Bus 9 | K674<br>Bus 4 | K673<br>Bus 3 | K672<br>Bus 2 | K671<br>Bus 1 |
| | | | | Matrix Bus 'B' Output 20 | | | | |
| Reg. 89 | NC | NC | NC | K680<br>Bus 9 | K679<br>Bus 7 | K678<br>Bus 5 | K677<br>Bus 2 | K676<br>Bus 1 |
| | | | | Matrix Bus 'B' Output 21 | | | | |
| Reg. 90 | NC | NC | NC | K685<br>Bus 8 | K684<br>Bus 5 | K683<br>Bus 4 | K682<br>Bus 2 | K681<br>Bus 1 |
| | | | | Matrix Bus 'B' Output 22 | | | | |
| Reg. 91 | NC | NC | NC | K690<br>Bus 8 | K689<br>Bus 7 | K688<br>Bus 4 | K687<br>Bus 2 | K686<br>Bus 1 |
| | | | | Matrix Bus 'B' Output 23 | | | | |
| Reg. 92 | NC | NC | NC | K695<br>Bus 7 | K694<br>Bus 6 | K693<br>Bus 4 | K692<br>Bus 2 | K691<br>Bus 1 |
| | | | | Matrix Bus 'B' Output 24 | | | | |
| Reg. 93 | NC | NC | NC | K700<br>Bus 8 | K699<br>Bus 6 | K698<br>Bus 4 | K697<br>Bus 2 | K696<br>Bus 1 |
| | | | | Matrix Bus 'C' Instrument Input 1 (lower bus bits 4-0) | | | | |
| Reg. 94A | NC | NC | NC | K705<br>Bus 4 | K704<br>Bus 3 | K703<br>Bus 2 | K702<br>Bus 1 | K701<br>Bus 0 |
| | | | | Matrix Bus 'C' Instrument Input 1 (upper bus bits 9-5) | | | | |
| Reg. 94B | NC | NC | NC | K710<br>Bus 9 | K709<br>Bus 8 | K708<br>Bus 7 | K707<br>Bus 6 | K706<br>Bus 5 |
| | | | | Matrix Bus 'C' Instrument Input 2 (lower bus bits 4-0) | | | | |
| Reg. 95A | NC | NC | NC | K715<br>Bus 4 | K714<br>Bus 3 | K713<br>Bus 2 | K712<br>Bus 1 | K711<br>Bus 0 |
| | | | | Matrix Bus 'C' Instrument Input 2 (upper bus bits 9-5) | | | | |
| Reg. 95B | NC | NC | NC | K720<br>Bus 9 | K719<br>Bus 8 | K718<br>Bus 7 | K717<br>Bus 6 | K716<br>Bus 5 |

TABLE 4-continued

Control/Status Register Relay Assignments

| Control/Status Register | Bit 7 (MSB) | Bit 6 | Bit 5 | Bit 4 | Bit 3 | Bit 2 | Bit 1 | Bit 0 (LSB) |
|---|---|---|---|---|---|---|---|---|
| | | | | Matrix Bus 'C' Instrument Input 3 (lower bus bits 4-0) | | | | |
| Reg. 96A | NC | NC | NC | K725 Bus 4 | K724 Bus 3 | K723 Bus 2 | K722 Bus 1 | K721 Bus 0 |
| | | | | Matrix Bus 'C' Instrument Input 3 (upper bus bits 9-5) | | | | |
| Reg. 96B | NC | NC | NC | K730 Bus 9 | K729 Bus 8 | K728 Bus 7 | K727 Bus 6 | K726 Bus 5 |
| | | | | Matrix Bus 'C' instrument Input 4 (lower bus bits 4-0) | | | | |
| Reg. 97A | NC | NC | NC | K735 Bus 4 | K734 Bus 3 | K733 Bus 2 | K732 Bus 1 | K731 Bus 0 |
| | | | | Matrix Bus 'C' Instrument Input 4 (upper bus bits 9-5) | | | | |
| Reg. 97B | NC | NC | NC | K740 Bus 9 | K739 Bus 8 | K738 Bus 7 | K737 Bus 6 | K736 Bus 5 |
| | | | | Matrix Bus 'C' Instrument Input 5 (lower bus bits 4-0) | | | | |
| Reg. 98A | NC | NC | NC | K745 Bus 4 | K744 Bus 3 | K743 Bus 2 | K742 Bus 1 | K741 Bus 0 |
| | | | | Matrix Bus 'C' Instrument Input 5 (upper bus bits 9-5) | | | | |
| Reg. 98B | NC | NC | NC | K750 Bus 9 | K749 Bus 8 | K748 Bus 7 | K747 Bus 6 | K746 Bus 5 |
| | | | | Matrix Bus 'C' Instrument Input 6 (lower bus bits 4-0) | | | | |
| Reg. 99A | NC | NC | NC | K755 Bus 4 | K754 Bus 3 | K753 Bus 2 | K752 Bus 1 | K751 Bus 0 |
| | | | | Matrix Bus 'C' Instrument Input 8 (upper bus bits 9-5) | | | | |
| Reg. 99B | NC | NC | NC | K760 Bus 9 | K759 Bus 8 | K758 Bus 7 | K757 Bus 6 | K756 Bus 5 |
| | | | | Matrix Bus 'C' Instrument Input 7 (lower bus bits 4-0) | | | | |
| Reg. 100A | NC | NC | NC | K765 Bus 4 | K764 Bus 3 | K763 Bus 2 | K762 Bus 1 | K761 Bus 0 |
| | | | | Matrix Bus 'C' instrument Input 7 (upper bus bits 9-5) | | | | |
| Reg. 100B | NC | NC | NC | K770 Bus 9 | K769 Bus 8 | K768 Bus 7 | K767 Bus 6 | K766 Bus 5 |
| | | | | Matrix Bus 'C' Instrument Input 8 (lower bus bits 4-0) | | | | |
| Reg. 101A | NC | NC | NC | K775 Bus 4 | K774 Bus 3 | K773 Bus 2 | K772 Bus 1 | K771 Bus 0 |
| | | | | Matrix Bus 'C' Instrument Input 8 (upper bus bits 9-5) | | | | |
| Reg. 101B | NC | NC | NC | K780 Bus 9 | K779 Bus 8 | K778 Bus 7 | K777 Bus 6 | K776 Bus 5 |
| | | | | Matrix Bus 'C' Output 1 | | | | |
| Reg. 102 | NC | NC | NC | K785 Bus 6 | K784 Bus 5 | K783 Bus 4 | K782 Bus 3 | K781 Bus 2 |
| | | | | Matrix Bus 'C' Output 2 | | | | |
| Reg. 103 | NC | NC | NC | K790 Bus 9 | K789 Bus 5 | K788 Bus 4 | K787 Bus 3 | K786 Bus 2 |
| | | | | Matrix Bus 'C' Output 3 | | | | |
| Reg. 104 | NC | NC | NC | K795 Bus 8 | K794 Bus 5 | K793 Bus 4 | K792 Bus 3 | K791 Bus 2 |
| | | | | Matrix Bus 'C' Output 4 | | | | |
| Reg. 105 | NC | NC | NC | K800 Bus 8 | K799 Bus 6 | K798 Bus 4 | K797 Bus 3 | K796 Bus 2 |
| | | | | Matrix Bus 'C' Output 5 | | | | |
| Reg. 106 | NC | NC | NC | K805 Bus 7 | K804 Bus 6 | K803 Bus 4 | K802 Bus 3 | K801 Bus 2 |
| | | | | Matrix Bus 'C' Output 6 | | | | |
| Reg. 107 | NC | NC | NC | K810 Bus 7 | K809 Bus 5 | K808 Bus 4 | K807 Bus 3 | K806 Bus 2 |

TABLE 4-continued

Control/Status Register Relay Assignments

| Control/Status Register | Bit 7 (MSB) | Bit 6 | Bit 5 | Bit 4 | Bit 3 | Bit 2 | Bit 1 | Bit 0 (LSB) |
|---|---|---|---|---|---|---|---|---|
| | | | | Matrix Bus 'C' Output 7 | | | | |
| Reg. 108 | NC | NC | NC | K815 Bus 9 | K814 Bus 8 | K813 Bus 4 | K812 Bus 3 | K811 Bus 2 |
| | | | | Matrix Bus 'C' Output 8 | | | | |
| Reg. 109 | NC | NC | NC | K820 Bus 9 | K819 Bus 6 | K818 Bus 4 | K817 Bus 3 | K816 Bus 2 |
| | | | | Matrix Bus 'C' Output 9 | | | | |
| Reg. 110 | NC | NC | NC | K825 Bus 9 | K824 Bus 7 | K823 Bus 4 | K822 Bus 3 | K821 Bus 2 |
| | | | | Matrix Bus 'C' Output 10 | | | | |
| Reg. 111 | NC | NC | NC | K830 Bus 7 | K829 Bus 6 | K828 Bus 5 | K827 Bus 3 | K826 Bus 2 |
| | | | | Matrix Bus 'C' Output 11 | | | | |
| Reg. 112 | NC | NC | NC | K835 Bus 8 | K834 Bus 6 | K833 Bus 5 | K832 Bus 3 | K831 Bus 2 |
| | | | | Matrix Bus 'C' Output 12 | | | | |
| Reg. 113 | NC | NC | NC | K840 Bus 8 | K839 Bus 7 | K838 Bus 4 | K837 Bus 3 | K836 Bus 2 |
| | | | | Matrix Bus 'C' Output 13 | | | | |
| Reg. 114 | NC | NC | NC | K845 Bus 8 | K844 Bus 6 | K843 Bus 5 | K842 Bus 4 | K841 Bus 2 |
| | | | | Matrix Bus 'C' Output 14 | | | | |
| Reg. 115 | NC | NC | NC | K850 Bus 9 | K849 Bus 6 | K848 Bus 5 | K847 Bus 4 | K848 Bus 2 |
| | | | | Matrix Bus 'C' Output 15 | | | | |
| Reg. 116 | NC | NC | NC | K855 Bus 0 | K854 Bus 6 | K853 Bus 5 | K852 Bus 4 | K851 Bus 2 |
| | | | | Matrix Bus 'C' Output 16 | | | | |
| Reg. 117 | NC | NC | NC | K860 Bus 0 | K859 Bus 7 | K858 Bus 5 | K857 Bus 4 | K856 Bus 2 |
| | | | | Matrix Bus 'C' Output 17 | | | | |
| Reg. 118 | NC | NC | NC | K865 Bus 9 | K864 Bus 7 | K863 Bus 5 | K862 Bus 4 | K861 Bus 2 |
| | | | | Matrix Bus 'C' Output 18 | | | | |
| Reg. 119 | NC | NC | NC | K870 Bus 8 | K869 Bus 7 | K868 Bus 5 | K867 Bus 4 | K866 Bus 2 |
| | | | | Matrix Bus 'C' Output 19 | | | | |
| Reg. 120 | NC | NC | NC | K875 Bus 0 | K874 Bus 5 | K873 Bus 4 | K872 Bus 3 | K871 Bus 2 |
| | | | | Matrix Bus 'C' Output 20 | | | | |
| Reg. 121 | NC | NC | NC | K880 Bus 0 | K879 Bus 8 | K878 Bus 6 | K877 Bus 3 | K876 Bus 2 |
| | | | | Matrix Bus 'C' Output 21 | | | | |
| Reg. 122 | NC | NC | NC | K885 Bus 9 | K884 Bus 6 | K883 Bus 5 | K882 Bus 3 | K881 Bus 2 |
| | | | | Matrix Bus 'C' Output 22 | | | | |
| Reg. 123 | NC | NC | NC | K890 Bus 9 | K889 Bus 8 | K888 Bus 5 | K887 Bus 3 | K886 Bus 2 |
| | | | | Matrix Bus 'C' Output 23 | | | | |
| Reg. 124 | NC | NC | NC | K895 Bus 8 | K894 Bus 7 | K893 Bus 5 | K892 Bus 3 | K891 Bus 2 |

TABLE 4-continued

Control/Status Register Relay Assignments

| Control/Status Register | Bit 7 (MSB) | Bit 6 | Bit 5 | Bit 4 | Bit 3 | Bit 2 | Bit 1 | Bit 0 (LSB) |
|---|---|---|---|---|---|---|---|---|
| | | | | Matrix Bus 'C' Output 24 | | | | |
| Reg. 125 | NC | NC | NC | K900 Bus 9 | K899 Bus 7 | K898 Bus 5 | K897 Bus 3 | K896 Bus 2 |

Figure 9:
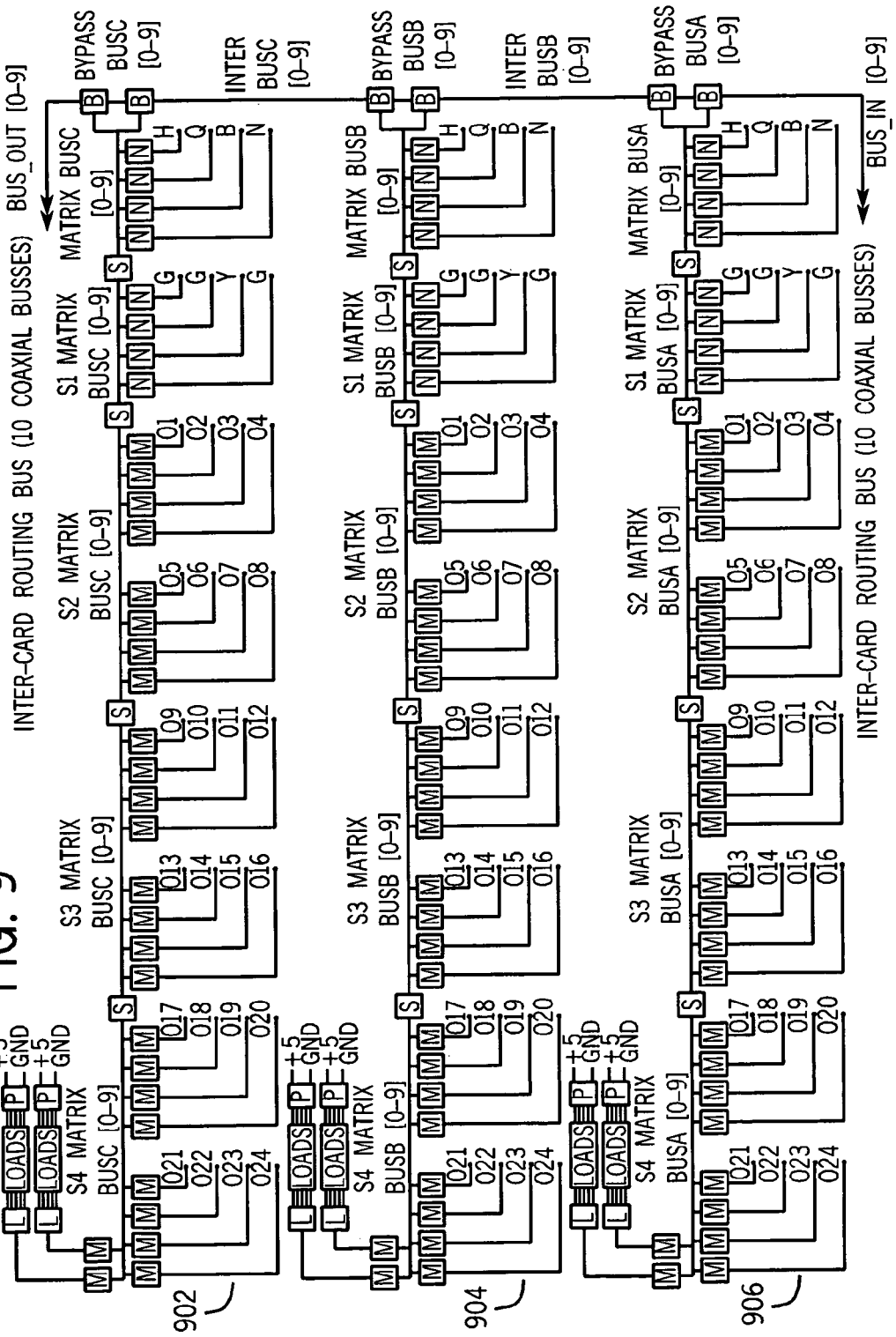
FIG. 9 shows a logical relay layout schematic of the switch matrix module shown in FIG. 6.

In FIG. 9 there is shown a logical relay layout for a switch matrix modules in accordance with an embodiment of the invention. Each of the three 8×24 matrix 902, 904 and 906 are highlighted. Achieving the packaging of three 8×24 matrices into one VXI card slot required a large amount of consideration in the packaging of the relays. One solution was the connection of the over one thousand signals from the control board to the relay board which was accomplished by using 5 high density 200-pin connectors. Also, the nine hundred relays used in this embodiment were placed on two boards joined together with through interconnects. The bottom (mother board) contains all of the VXI interconnects and driver devices. The top (daughter board) card contains the switching components, with the design being single wire.

The diagram legend for the triple 8×24 matrix block diagram shown in FIG. 9 is as follows:
M=Bus select multiplexer (mux)
B=Inter-matrix bus select
S=Stub breaking relays
L=Load select multiplexer (mux)
P=Termination select The design achieved parameters such as:
Path resistance: <900 mOhm
Bandwidth: >60 MHz
Isolation: >60 dB
Impedance: 50 Ohm
Impulse withstanding voltage: >1000 Vrms
Also shown in FIG. 9 are the programmable load terminations 908 which were previously discussed.

By adding stub breakers for every 4 relays in one embodiment of the invention, the bus can be broken off and unused portions of the matrix can be isolated. This minimizes frequency degradation due to unused stub lengths. With the implementation of "3-way: stub-breakers at the matrix front-ends that can either completely isolate a middle matrix or cut off stubs left or right of the destination and source matrices, larger matrices can be formed on the 10 lane expansion bus by daisy-chaining multiple switch matrix modules via the front panel. This is accomplished by connecting the J207 connector (see FIG. 7) of one switch matrix module to the J206 connection of the following switch matrix module. The stub breakers also allow for flexibility of configuration. For example, an 8×24 matrix can be configured as a 1×4 or other switch configuration through the application of the stub breakers. The programmability of the stub breakers allows for maximum flexibility in the design.

Figure 10:
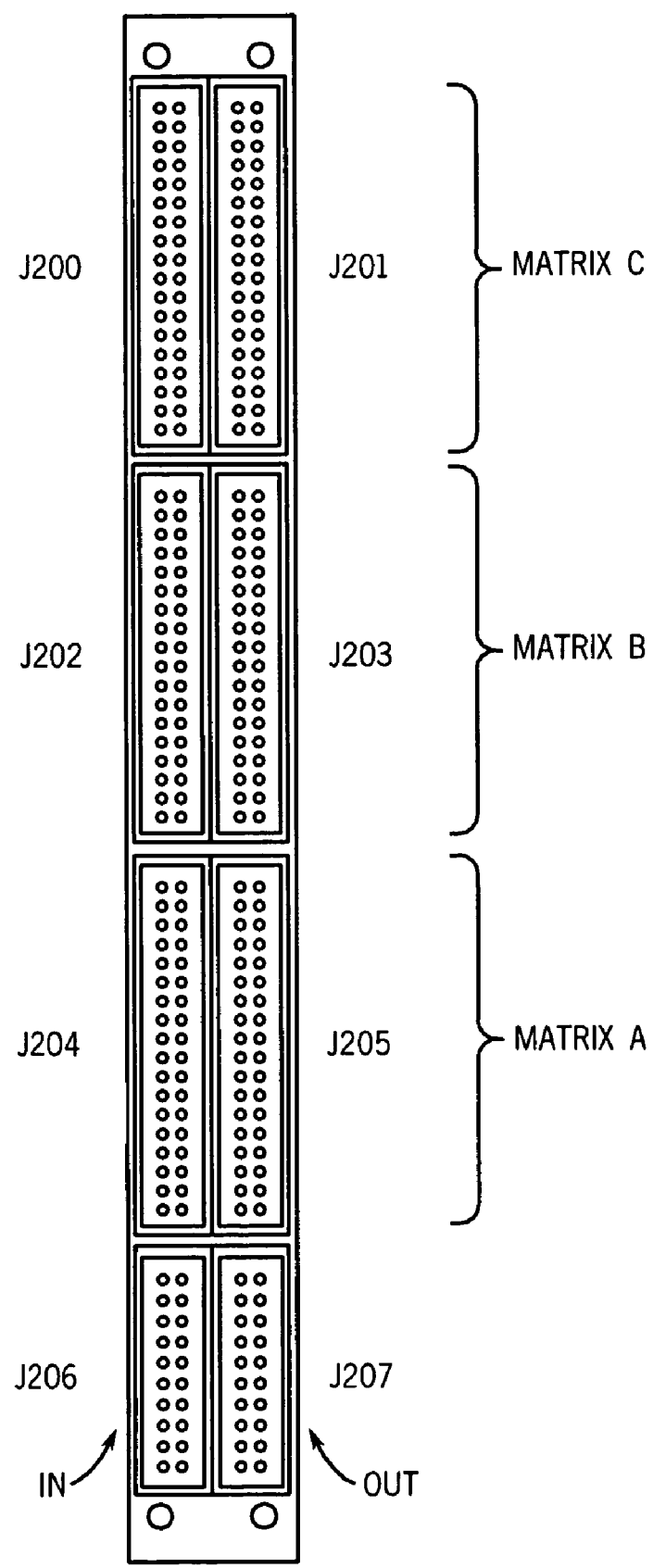
FIG. 10 shows a set of front panel connectors of the switch matrix module shown in FIG. 6.
Figure 11:
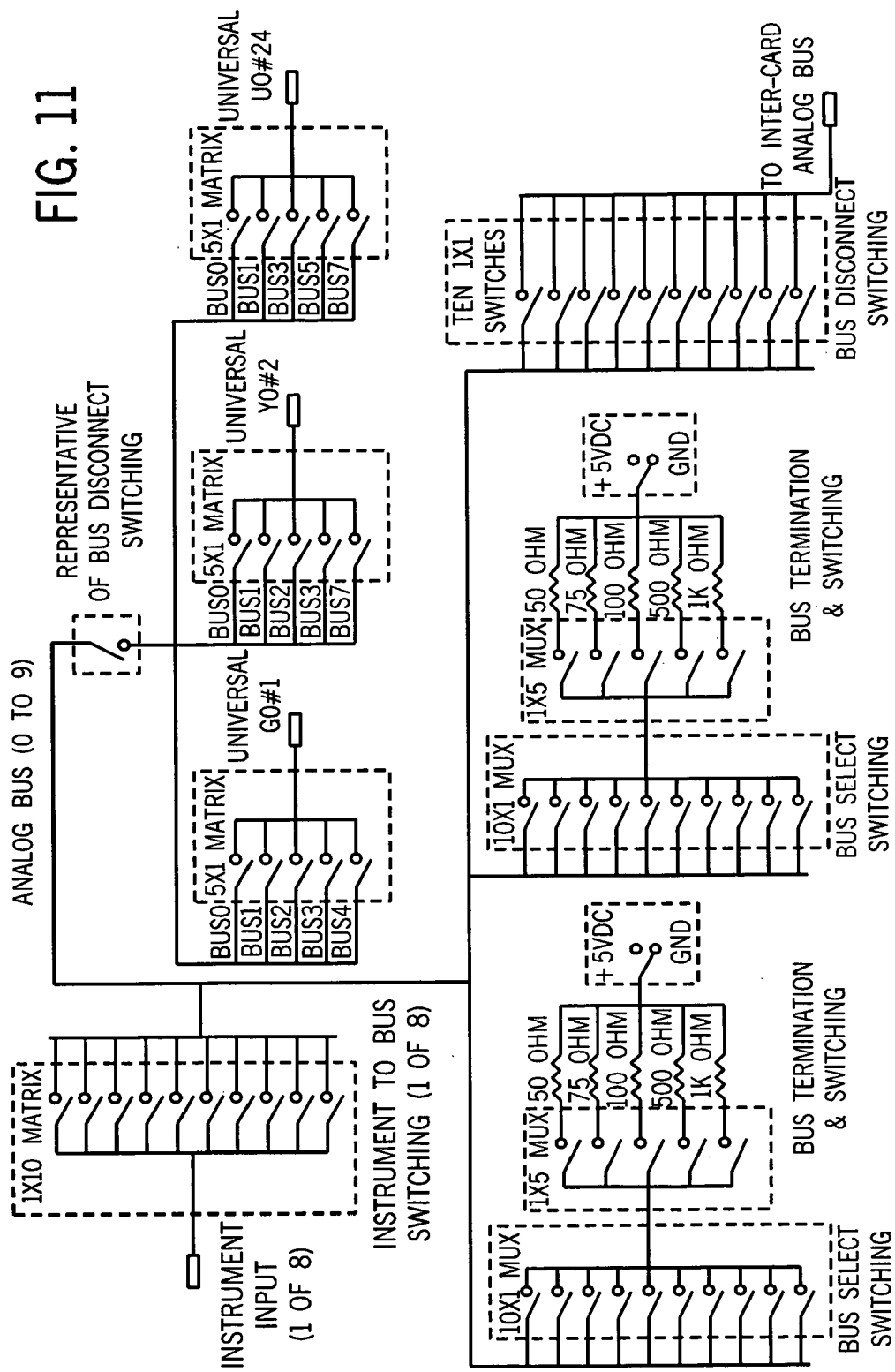
FIG. 11 shows a block diagram of the switch matrix module shown in FIG. 6.

In FIG. 10 there is shown the front panel connectors for the triple 8×24 matrix module in accordance with one embodiment of the invention. By adding stub breakers for every 4 relays in one embodiment, the bus can be broken off and unused portions of the matrix can be isolated. This minimizes frequency degradation due to unused stub lengths. With the implementation of "3-way" stub breakers at the matrix front-ends that can either completely insolate a middle matrix or cut off stubs left or right of the destination and source matrices, larger matrices can be formed on the 10-lane expansion bus by daisy-chaining multiple matrices via their front panel connectors. This is accomplished by connecting the J207 connector of one matrix to the J206 connector of the following matrix, etc. A block diagram of the matrix module is shown in FIG. 11.

Figure 12:
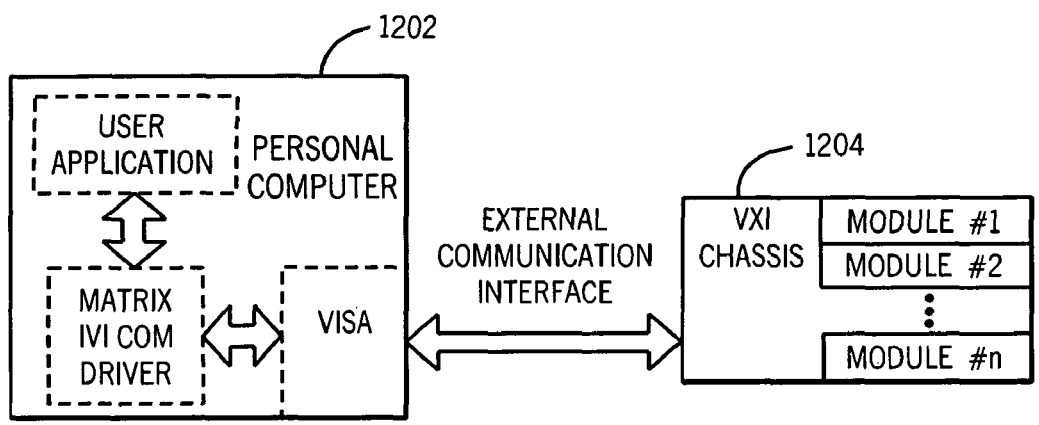
FIG. 12 shows a block diagram of a switch matrix system in accordance with an embodiment of the invention.

In FIG. 12 there is shown a block diagram of a switch matrix system in accordance with an embodiment of the invention. The system includes a controller such as a personal computer 1202 that includes a user application in communication with a matrix IVI com driver, which is in communication with a VISA block. An external communication interface couples the personal computer 1202 to the VXI chassis 1204 which includes the plurality of modules Module #1 to Module #N. The personal computer 1202 controls the switching of the different modules found in the VXI chassis 1204.

Figure 13:
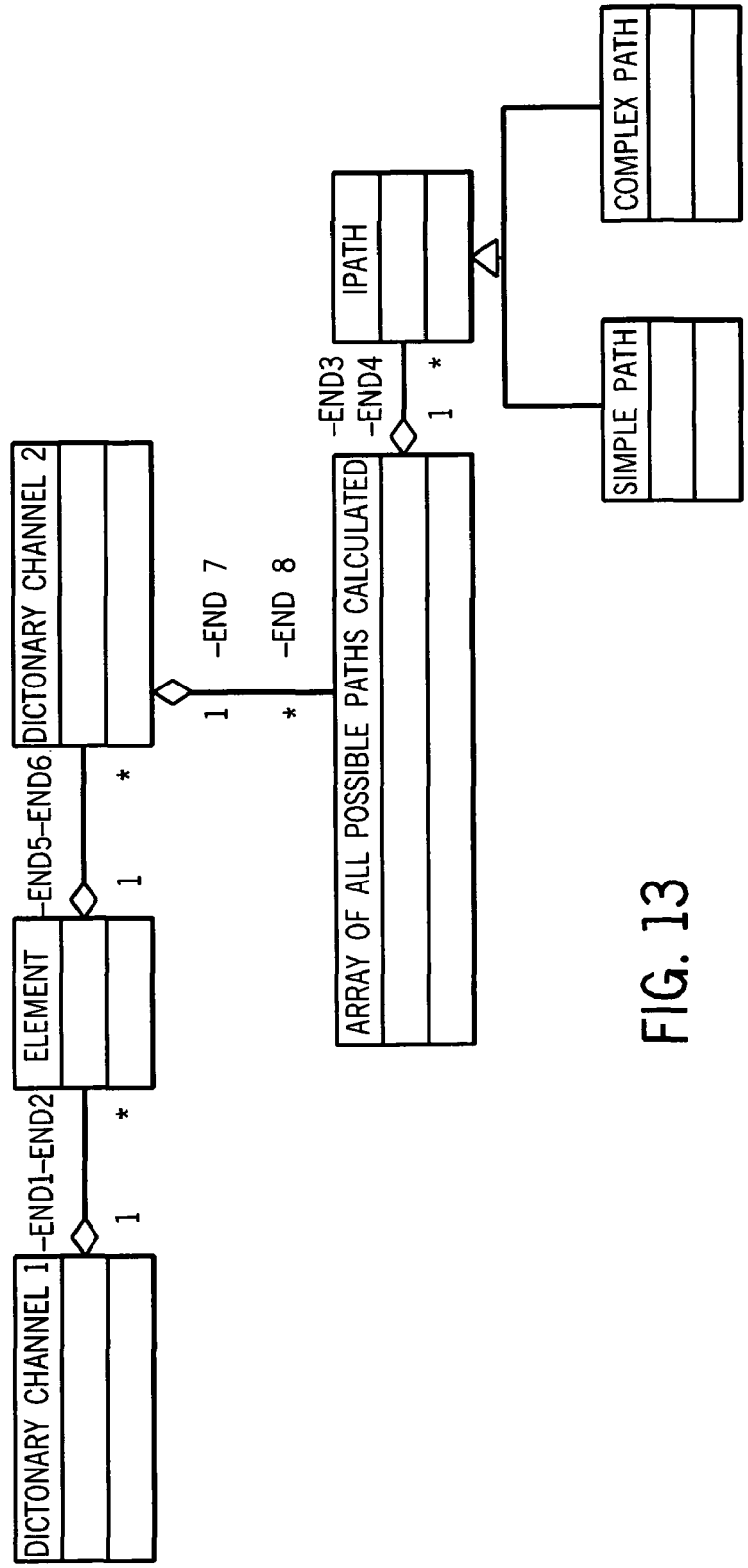
FIG. 13 shows a static structure of a path selection in accordance with an embodiment of the invention.

A static diagram of the path selection algorithm is shown in FIG. 13. Through the use of Mutually Exclusive Sets to represent switch topology which has enabled the invention to define switch cards for arbitrary topology which can still retain reasonable switch IVI driver performance. The algorithms for implementing IVI switch cards IVI-COM drivers are unique in nature. The switch topology is represented as a changing undirected graph amenable to standard graph theory algorithms.

One area of improvement in the invention is a Fast Path Lookup data structure. Previously, this was implemented with a basic array heap and hash table. In the invention, the software compiles a path search data structure which takes O(log 2 n) using a Red-Black tree embedded within a Red-Black tree. The advantages to this approach over hash table is that the Red-Black tree is always balanced so search for any path all takes roughly the same amount of time. The issue with hash table is that the search key in our case switch channel names are not randomly distributed over the alphabet. Hash tables rely on the fact that hash keys are randomly distributed evenly over the entire alphabet to be efficient. The hash function has to produce an even distribution otherwise, there will be an excessive number of collisions resulting in poor hash table insert and retrieve performance. This data structure is also unique in that it can store multiple alternative paths so that if one path is restricted, the driver can quickly search for other alternative paths which do not suffer from the same restrictions which has enabled us to be able to implement a complex highly interconnected topology such as the 1260-43. The Red-Black tree by itself is a standard computer science data structure. But a novel feature of the invention is the use of a Red-Black tree to create the Fast Path Lookup data structure. It is used essentially to create a dictionary map (channel 1 as key) each entry is another dictionary map which points a simple path, a composite path or an array of composite paths. The structure of this Fast Path Lookup table is showed in the UML diagram of FIG. 13. In the invention there is an option to turn off a "Best Path Searching Algorithm" from a complex to a simple mode. In the Complex Mode, in the invention, the IVI switch cores are enabled so that IVI switch features such as sources and configuration channels can be used. The driver can be set to operate in simple mode to disable these features so as to optimize the speed of switch drivers. The Simple mode allows the driver to close a channel which normally takes 50-150 ms (in complex mode) to around 1 ms (in simple mode). We are able to determine how to determine the best possible path by traversing though each edge of the graph representing our switch card and recursively walking the graph until we arrive at a best possible suitable path or until no path is found to satisfy the conditions.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A switch matrix module, comprising:
a switch matrix having first and second expansion points;
first and second three-way stub-breaker switches coupled respectively to the first and second expansion points;
the switch matrix comprises a cross-point switch matrix and is located in a first printed circuit board;
a second printed circuit board including:
a second matrix switch having first and second expansion points;
first and second three-way stub-breaker switches coupled respectively to the first and second expansion points; and
wherein the first and second three-way stub-breaker switches coupled respectively to the first and second expansion points on the switch matrix located on the first printed circuit board includes upstream and downstream switches and the first and second three-way stub-breaker switches coupled respectively to the first and second expansion points on the second switch matrix located on the second printed circuit board also includes upstream and downstream switches, and wherein the downstream switch of the first three-way stub breaker switch located on the first printed circuit board is electrically connected to the upstream switch of the first three-way stub breaker switch located on the second printed circuit board.

2. A switch matrix module as defined in claim 1, wherein the cross-point switch matrix comprises a N×M matrix.

3. A switch matrix module as defined in claim 1, wherein the downstream switch of the second three-way stub breaker switch located on the first printed circuit board is electrically connected to the upstream switch of the second three-way stub breaker switch located on the second printed circuit board.

4. A switch matrix module as defined in claim 1 wherein the first and second three-way stub-breaker switches are programmable.

5. A switch matrix module as defined in claim 4 further comprising:
an expansion bus coupled to the switch matrix and
a programmable load termination set to one of a plurality of different values and accuracies coupled to the expansion bus.

6. A switch matrix module as defined in claim 5, wherein the plurality of different values and accuracies are selected without incurring additional stub penalties.

7. A switch matrix module as defined in claim 4, wherein the switch matrix module is VXI compliant.

8. A switch matrix module, comprising:
a programmable load selection block;
a first set of stub breakers coupled to the programmable load selection block;
a first switch matrix coupled to the first set of stub breakers;
a second set of stub breakers coupled to the first switch matrix;
a second switch matrix coupled to the second set of stub breakers; and
a controller coupled to the first and second set of stub breakers, the controller stores multiple alternative switch matrix paths in case one switch matrix path is restricted the controller can quickly search for an alternative switch matrix path among the alternative switch matrix paths.

9. A switch matrix module as defined in claim 8, wherein the first and second set of stub breakers are software programmable and each includes at least one three-way switch.

10. A switch matrix module as defined in claim 9, further comprising an expansion bus selection block coupled to the second switch matrix.

11. A switch matrix module as defined in claim 9, wherein the controller uses mutually exclusive sets to represent switch matrix topologies.

12. A switch matrix module as defined in claim 8, wherein the programmable load selection block includes a load set including a pull-up to a predetermined voltage and a pull-down to ground potential.

13. A switch matrix module as defined in claim 12, wherein the load set is individually programmable to one of a plurality of predetermined values and accuracies.

14. A switch matrix module, comprising:
a programmable load selection block;
a first set of stub breakers coupled to the programmable load selection block;
a first switch matrix coupled to the first set of stub breakers;
a second set of stub breakers coupled to the first switch matrix;
a second switch matrix coupled to the second set of stub breakers;
a controller coupled to the first and second set of stub breakers, the controller uses mutually exclusive sets to represent switch matrix topologies;
the first and second set of stub breakers are software programmable and each includes at least one three-way switch; and
wherein the controller performs a switch path search data structure using a Red-Black tree embedded within a Red-Black tree.

15. A switch matrix module as defined in claim 14, wherein the controller stores multiple alternative switch matrix paths in case one switch matrix path is restricted the controller can quickly search for an alternative switch matrix path among the alternative switch matrix paths.

16. A switch matrix module as defined in claim 14, further comprising a switch driver coupled to the controller and the controller can disable a best path searching routine in order to optimize the speed of the switch driver.

17. A VXI compliant single slot switch matrix module, comprising:
a plurality of N×M switch matrices;
a set of programmable stub breaker switches which couple the plurality of N×M switch matrices to each other and break-off and isolate any unused portions of the plurality of N×M switch matrices in order to improve performance of the switch matrix module; and
wherein the set of programmable stub breaker switches comprise 3-way stub breaker switches that isolate upstream or downstream portions of the plurality of N×M switch matrices.

18. A VXI compliant single slot switch matrix module as defined in claim 17 wherein the N×M switch matrices comprise cross-point switches.

19. A VXI compliant single slot switch matrix module as defined in claim 17, an expansion bus coupled to the plurality of N×M switch matrices.

20. A VXI compliant single slot switch matrix module as defined in claim 19, further comprising a programmable load termination coupled to the expansion bus.

21. A switch matrix module, comprising:
- a plurality of N×M switch matrices;
- a set of programmable 3-way stub breaker switches that couple the plurality of N×M switch matrices to each other and break-off and isolate any unused portions of the plurality of N×M switch matrices, the 3-way stub breaker switches isolate any upstream or downstream portions of the plurality of N×M switch matrices; and
- a controller coupled to the set of programmable 3-way stub breaker switches, the controller stores multiple alternative switch matrix paths in case one switch matrix path is restricted the controller can quickly search for an alternative switch matrix path among the alternative switch matrix paths.

* * * * *